(12) United States Patent
Khandelwal et al.

(10) Patent No.: US 10,958,533 B2
(45) Date of Patent: Mar. 23, 2021

(54) TRACKING DATA FLOW IN DISTRIBUTED COMPUTING SYSTEMS

(71) Applicant: Morgan Stanley Services Group, Inc., New York, NY (US)

(72) Inventors: Akshat Khandelwal, New York, NY (US); Christian Walden, London (GB); Daren Clarke, Westport, CT (US); Ian Worley, London (GB); Jasvinder Saggu, London (GB); Spyridon Soukeras, London (GB); Stefano Brizzi, London (GB)

(73) Assignee: Morgan Stanley Services Group, Inc., New York, NY (US)

( * ) Notice: Subject to any disclaimer, the term of this patent is extended or adjusted under 35 U.S.C. 154(b) by 597 days.

(21) Appl. No.: 15/078,424

(22) Filed: Mar. 23, 2016

(65) Prior Publication Data

US 2016/0285701 A1  Sep. 29, 2016

Related U.S. Application Data

(60) Provisional application No. 62/136,939, filed on Mar. 23, 2015, provisional application No. 62/137,180, filed on Mar. 23, 2015.

(51) Int. Cl.
*H04L 12/24* (2006.01)
*G06Q 40/00* (2012.01)
(Continued)

(52) U.S. Cl.
CPC ............ *H04L 41/20* (2013.01); *G06F 3/0482* (2013.01); *G06F 3/04817* (2013.01);
(Continued)

(58) Field of Classification Search
CPC ........... G06F 2209/484; G06F 3/04842; G06F 17/30563; G06F 3/04817; G06F 3/0482;
(Continued)

(56) References Cited

U.S. PATENT DOCUMENTS 4,107,784 A * 8/1978 Van Bemmelen .... G06F 3/0489 341/23
9,779,457 B1 * 10/2017 Fisher .................... G06Q 40/06
(Continued)

FOREIGN PATENT DOCUMENTS

| JP | H06149555  | 5/1994 |
| JP | 2001043078 | 2/2001 |

(Continued)

OTHER PUBLICATIONS

YouTube video, Askozia Tutorial: How to Create an IVR Menu with the Call Flow Editor, published on Nov. 28, 2012, downloaded from https://www.youtube.com/watch?v=ViJJ_hcpbyw.*
(Continued)

*Primary Examiner* — Eric J Yoon
(74) *Attorney, Agent, or Firm* — K&L Gates LLP

(57) ABSTRACT

A distributed computing environment comprises a plurality of distributed computer systems that execute a plurality of applications. At least one of the distributed computer systems executes a data flow software tool that identifies potential data flows between the applications and generates a GUI that shows at least one upstream application and/or at least one downstream application for a subject application. The data flow software tool receives, via the GUI, from the user, a first input for the at least one upstream application and/or a second input for the at least one downstream application. The first input comprises a verification that the at least one upstream application provides the incoming data flow to the subject application and the second input com-
(Continued)

prises a verification that the at least one downstream application receives the outgoing data flow from the subject application.

20 Claims, 45 Drawing Sheets

(51) Int. Cl.
| | |
|---|---|
| *G06Q 10/10* | (2012.01) |
| *G06Q 10/06* | (2012.01) |
| *G06Q 40/06* | (2012.01) |
| *G06F 3/0481* | (2013.01) |
| *G06F 3/0482* | (2013.01) |
| *G06F 3/0484* | (2013.01) |
| *H04L 12/927* | (2013.01) |

(52) U.S. Cl.
CPC ......... *G06F 3/04842* (2013.01); *G06Q 10/06* (2013.01); *G06Q 10/10* (2013.01); *G06Q 40/00* (2013.01); *G06Q 40/06* (2013.01); *H04L 41/22* (2013.01); *H04L 47/80* (2013.01)

(58) Field of Classification Search
CPC ....... H04L 47/20; H04L 41/22; H04L 43/045; H04L 43/028; G06Q 40/04; G06Q 40/00; G06Q 40/06; G06Q 10/06; G06Q 10/10
See application file for complete search history.

(56) References Cited

U.S. PATENT DOCUMENTS

| | | | |
|---|---|---|---|
| 2002/0032640 A1* | 3/2002 | LaFore | G06Q 40/06 705/37 |
| 2004/0046785 A1 | 3/2004 | Keller | |
| 2004/0049509 A1 | 3/2004 | Keller et al. | |
| 2008/0120248 A1* | 5/2008 | Roehr | G06Q 40/04 705/36 R |
| 2013/0104146 A1 | 4/2013 | Yadav et al. | |
| 2013/0332899 A1* | 12/2013 | Stewart | G06F 9/44505 717/121 |
| 2014/0324508 A1* | 10/2014 | Becker | G06F 3/04817 705/7.22 |
| 2015/0372877 A1* | 12/2015 | Tompkins | G06F 3/04842 715/736 |

FOREIGN PATENT DOCUMENTS

| | | |
|---|---|---|
| JP | 2004103015 | 4/2004 |
| JP | 2011215978 | 10/2011 |
| JP | 2014532909 | 12/2014 |
| WO | WO2013054581 | 4/2013 |

OTHER PUBLICATIONS

International Search Report and Written Opinion for PCT/US2016/023797, dated Jun. 7, 2016 (11 pages).

\* cited by examiner

TRACKING DATA FLOW IN DISTRIBUTED COMPUTING SYSTEMS

PRIORITY CLAIM

The present application claims priority to provisional application Ser. No. 62/136,939 and Ser. No. 62/137,180, both of which were filed on Mar. 23, 2015 and both of which are incorporated herein by reference in their entireties, respectively.

BACKGROUND

Modern computing systems include large numbers of applications executed across different networked computing devices, often across geographic boundaries. Many applications perform processing on data flows generated by other applications executing on the computing system. Likewise, many applications provide data flows to other applications. As the complexity of computing systems increases, it has become increasingly difficult to identify and trace data flows.

SUMMARY

In one general aspect, the present invention is directed to a distributed computing environment that comprises a plurality of distributed computer systems interconnected by one or more data networks. The plurality of distributed computer systems executes a plurality of applications. At least one of the distributed computer systems executes a data flow software tool that identifies potential data flows between the plurality of applications and generates a GUI that shows at least one upstream application and at least one downstream application for a subject application. The subject application can be selected by a user via the GUI; the at least one upstream application is an application that provides an incoming data flow to subject application; and the at least one downstream application is an application that receives an outgoing data flow from the subject application. In addition, the data flow software tool (when executed by the at least one computer system) receives, via the GUI, from the user, a first input for the at least one upstream application and a second input for the at least one downstream application. The first input comprises a verification that the at least one upstream application provides the incoming data flow to the subject application and the second input comprises a verification that the at least one downstream application receives the outgoing data flow from the subject application.

Embodiments of the present invention provide an efficient way for administrative users to rapidly assess data flows in complex, application-based distributed computing system and identify circumstances where remedial action is needed to maintain the validity of the data for the applications and/or the data flows. These and other benefits of the present invention will be apparent from the description that follows.

FIGURES

Various examples are described herein in conjunction with the following figures, wherein.

DESCRIPTION

Various examples described herein are directed to systems and methods for tracking data flows in distributed computing systems. Distributed computing systems may include computing systems that execute multiple applications across multiple networked computing devices. Some applications may be executed at a single computing device, while other applications may be executed across more than one computing device. The systems and methods described herein may be implemented in any suitable type of distributed computing system. In some examples, the systems and methods described herein may be implemented in a distributed computing system implemented by a financial services firm. For example, such a distributed computing system may be utilized to track various different types of financial transactions. In other examples, the systems and methods described herein may be implemented in a distributed computing system implemented by another type of enterprise, such as, for example, a retailer. For example, data flows in a retailer-implemented distributed computing system may track inventory and supply chains.

Figure 1:
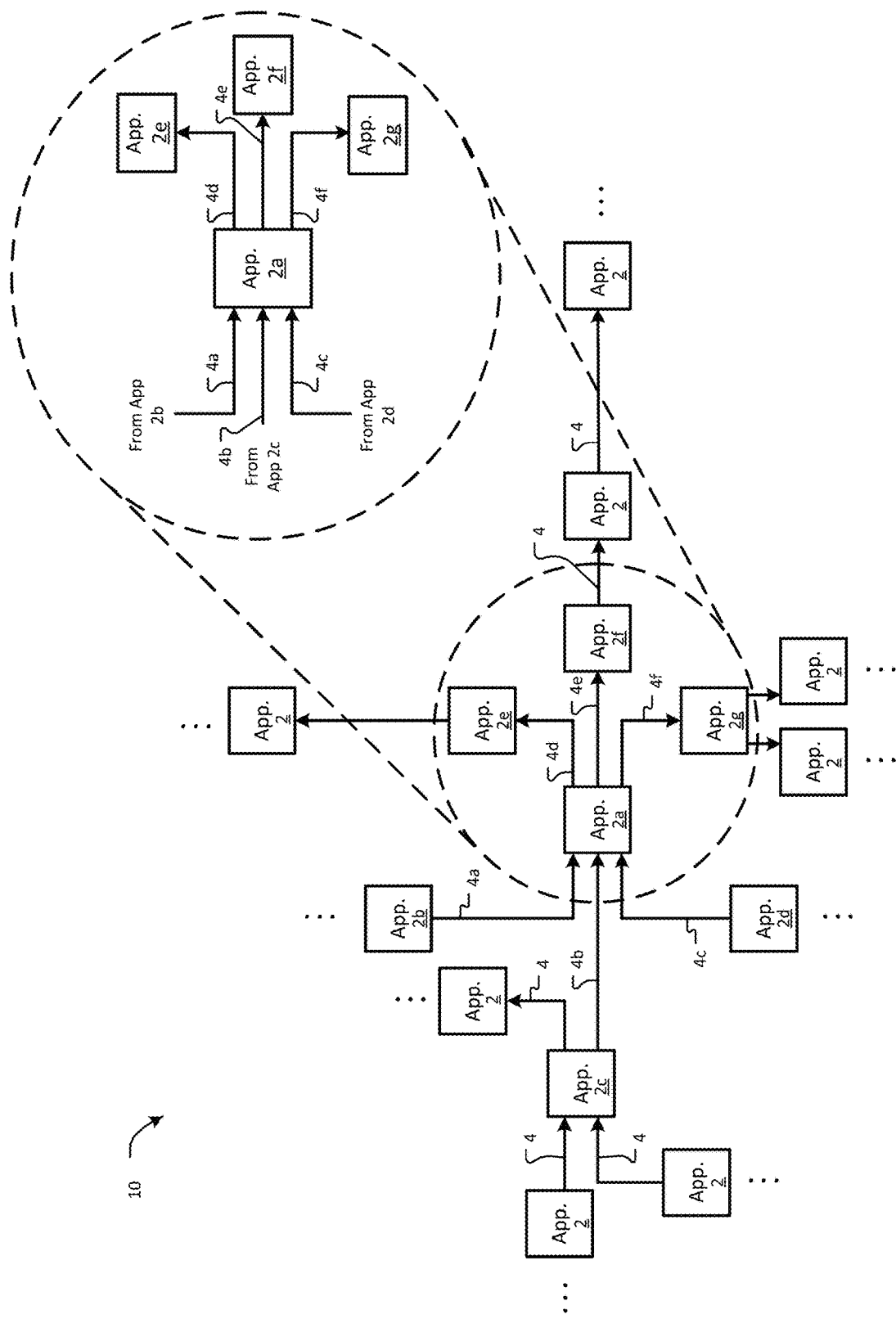
FIG. 1 is a diagram showing one example of a distributed computing system environment.

FIG. 1 is a diagram showing one example of a distributed computing system environment 10. The environment 10 comprises various applications 2 and data flows 4 between the applications 2. The applications 2 may be executed by a distributed computing system, for example, as described herein (e.g., FIG. 2). Data flows 4 may pass between the various applications 2, as shown. It will be appreciated that the arrangement of applications 2 and data flows 4 in the environment 10 of FIG. 1 represent just one example of how a distributed computing system may be organized. Any suitable number or arrangement of applications 2 and data flows 4 may be used. Further, the environment 10 may include additional applications 2 and/or data flows 4 in any suitable configuration (e.g., indicated by the illustrated ellipses " . . . ").

In various examples, each data flow 4 may be described by a data concept type, data flow boundary data, and/or data attribute. In some examples, data concept type may relate to an aspect of a business function of the data flow. For example, in the context of a financial services firm, data concept types may include: trade contracts, positions, market valuation, profit and loss (P&L), and general ledger. One or more applications may generate trade contracts data flows. A trade contracts data flow may be provided to a downstream application, which may utilize the trade contracts data to generate a position data flow describing positions resulting from the trade contracts data. (The positions may be held by the financial services firm, a client of the financial services firm, or other holding entity.) The positions data flow may be provided to another downstream application, which may generate a market valuation data flow describing the market value of the positions. The market value data flow may be provided to yet another downstream application, which may generate a P&L flow describing profit and loss to the holding entity based on the market value of the positions. The P&L flow may be provided to still another downstream application, which may generate a general ledger data flow describing financial ledger entries for the holding entity. Data flow boundary data may describe additional features of a data flow, particularly boundaries of a data flow, for instance. For example, a data flow may include a subset of its data type, with the subset of the data type defined by boundary data. In the context of the financial services firm example described above, example boundary data may describe a type of security, a geographic location, a legal jurisdiction, etc. A data attribute may be a parameter related to a data concept type. For example, in the context of financial services, the data attributes could be prices, value amount, currencies, dates, etc. For example, if the data concept type is market value, the data attributes may be market value amount or market value currency. For an option trade data concept type, the attributes may be strike price and expiration date, for example.

Data flows 4 may be implemented in the environment 10 using any suitable transfer mechanisms. Example transfer mechanisms for data flows include data queues, data stacks, databases, publication/subscription (pub/sub) services, data directories, batch job dependencies, mainframe adaptable database system (ADABAS) file usage, etc. According to queues and stacks an upstream application 2 may push one or more output data flows 4 to a data structure (e.g., a queue or a stack) accessible to one or more other applications 2. Downstream applications 2 may access the data structure to obtain the data flow or flows 4. In some examples, an upstream application 2 may write a data flow 4 to a database (e.g., a database included in the distributed computing system). One or more downstream applications 2 may query the database to obtain the data flow 4. In some examples, an upstream application 2 may implement and/or provide data flow 4 information to a pub/sub service. Downstream applications 2 that are to receive the data flow 4 may subscribe to the pub/sub service. When new data pertaining to a data flow is received at the pub/sub service, it may publish the data to the subscribing downstream applications 2. In some examples, an upstream application 2 may write a data flow 4 to a hosted directory, such as a lightweight directory access protocol (LDAP) directory. One or more downstream applications 2 may access the data flow 4 by querying the directory. As such, a "data flow" can be considered an electronic transmission of data between apps using a data transfer mechanism. The data flow transfer mechanisms described are provided as examples only. Any suitable transfer mechanism may be used to implement a data flow 4 between two or more applications 2. In various examples, various other data flow transfer mechanisms may be used.

A breakout section 6 shows a data flow perspective of a single application 2a. For example, the application 2a receives upstream data flows 4a, 4b, 4c from other applications 2b, 2c, 2d. Downstream data flows 4d, 4e, 4f may originate from the application 2a and provided to downstream applications 2e, 2f, 2g. In the example of FIG. 1, data flow 4a is received from an upstream application 2b; data flow 4b is received from an upstream application 2c; and data flow 4c is received from upstream application 2d. Downstream data flow 4d is provided to application 2e; downstream data flow 4e is provided to application 2f; and downstream data flow 4f is provided to application 4g. The breakout section 6 shows just one example configuration for an application 2a. Applications 2 may have any suitable number and configuration of input data flows and output data flows.

Figure 2:
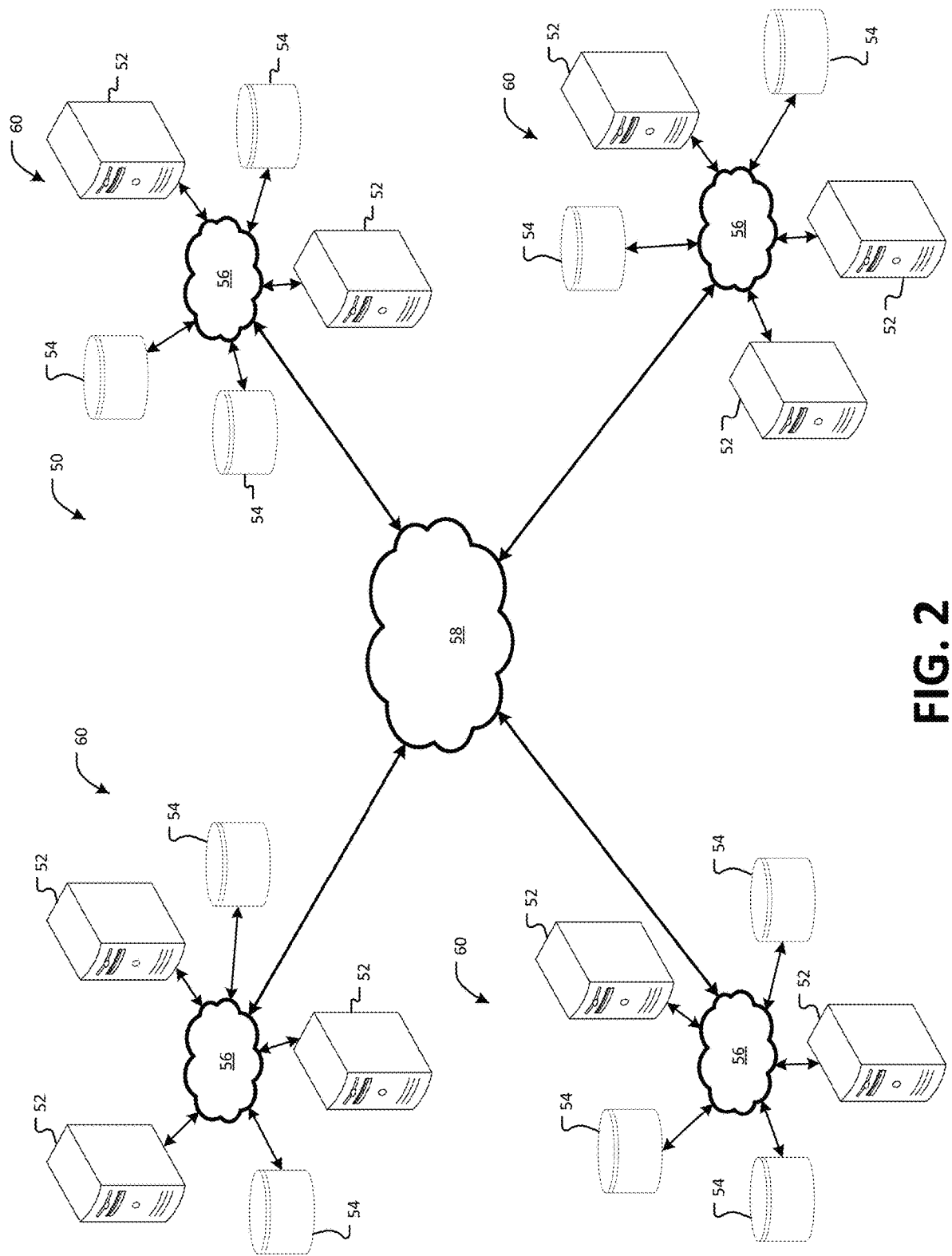
FIG. 2 is a diagram showing one example of a distributed computing system that may be used to implement the environment of FIG. 1.

FIG. 2 is a diagram showing one example of a distributed computing system 50 that may be used to implement the environment 10 of FIG. 1. The distributed computing system 50 may comprise various computing devices 52 and associated data stores 54. Computing devices 52 may comprise any suitable computing device, for example, as described herein. Some computing devices 52 may be and/or comprise one or more servers. Data stores 54 may be associated with a single computing device 52 (e.g., an administering computing device) and/or may be accessible to multiple computing devices 52. The data stores 54 may be implemented with computer databases managed by database management software (DBMS). The computing devices 52 and data stores 54 may be in communication with one another via one or more networks 56, 58. Networks 56, 58 may be and/or comprise any suitable type of wired and/or wireless networks. In some examples, one or more of networks 56, 58 may be and/or comprise the Internet.

In some examples, the distributed computing system 50 may comprise one or more system nodes 60. A system node 60 may comprise computing devices 52 and/or data stores 54 that share a common geographic location and/or business function. Each system node 60 may utilize a common node network 56. A node network 56 may be a separate local area network (LAN) accessible to components of a system node 60. In some examples, a node network 56 may comprise a virtual private network (VPN) or other virtual network (e.g., secure virtual network) accessible to components of the system node 60. Components 52, 54 from different system nodes 60 may communicate with one another utilizing a common network 58. The common network 58 may be and/or comprise a VPN or other virtual secure network. The networks 56, 58 may be and/or comprise any suitable type of wired and/or wireless networks. In some examples, one or more of networks 56, 58 may be and/or comprise the Internet.

Referring now back to the environment 10 of FIG. 1, in many implementations it is desirable to track the various data flows 4 between applications. For example, in the context of a financial services firm and other contexts, it may be important for the various applications 2 to generate outputs that are correct. For example, some of the applications 2 may generate reports describing the financial condition of the financial services firm (e.g., reports of firm P&L, etc.). In some cases, reports or other outputs of the various applications 2 may be required for regulatory compliance or heightening the importance of accuracy. In the context of a retailer, it may be important for the applications 2 to generate correct outputs so as to accurately and efficiently track the inventory and supply chains of the retailer. Verifying that an application output is correct may involve tracing data flows 4 received by the application 2 across multiple "jumps" between applications. For example, verifying the accuracy of the output of the application 2f may comprise tracing the data flow 4e as well as any of the data flows 4a, 4b, 4c that are used to generate the data flow 4e.

Figure 3:
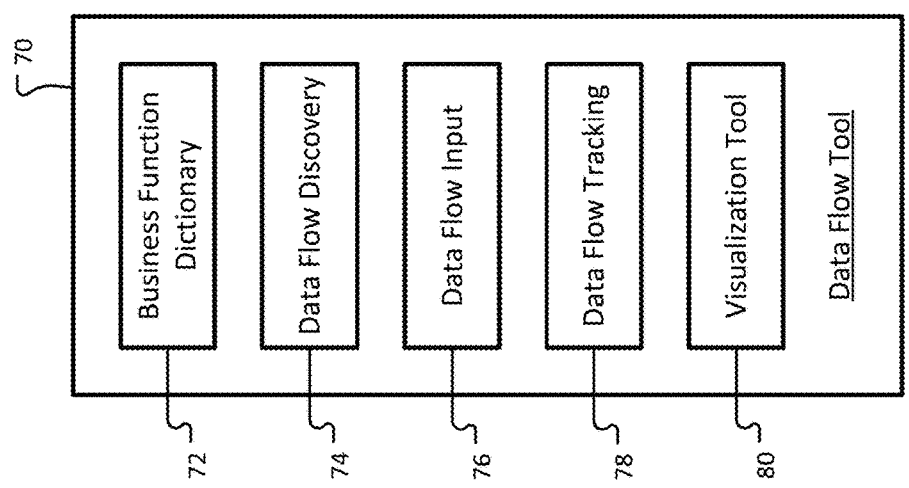
FIG. 3 is a block diagram showing one example of a data flow tool that may be executed by a distributed computing system, such as the system of FIG. 2.

FIG. 3 is a block diagram showing one example of a data flow tool 70 that may be executed by a distributed computing system, such as the system 50 of FIG. 2. In some examples, the data flow tool 70 may facilitate the tracking of data flows, as described herein. The data flow tool 70 may comprise one or more software applications configured to track data flows in the distributed computing system (e.g., applications 2 of the environment 10). The software application or applications may be executed by processors of the computer systems in the distributed computing system 50, such as the system 50 of FIG. 2.

The data flow tool 70 may comprise various functional modules 72, 74, 76, 78, 80 for tracking data flows. Each functional module may include one or more applications that may be executed at a single computing device 52 or across multiple computing devices 52 of the distributed computing system. Example functional modules of the data flow tool include a business function dictionary module 72, a data flow discovery module 74, a data flow input module 76, a data flow tracing module 78, and a visualization tool module 80. The business function dictionary module 72 may include definitions for data concept types (e.g., data concept type definitions). Data flow definitions, for example, may define a business function associated with a data concept type. In some examples, the data flow dictionary module 72 also includes, for each data concept type, a description of known and/or allowable boundaries. The boundary data may specify a subset of the data concept type (e.g., less than all of the data concept type). The dictionary module 72 may also include, for each data concept type and boundary, attribute data for the concept type. The attribute data may include parameters relevant to the concept type, such as price, value, currency, date, etc.

The data flow discovery module 74 may be configured to analyze interactions between applications 2 executing on the distributed computing system and identify potential data flows 4 (FIG. 1). The data flow discovery module 74 may also be configured to assign data concept types, boundary data, and/or data attributes (from the business function dictionary module 72) to potential data flows that are identified. The data flow input module 76 may provide an interface (e.g., a graphical user interface) to a user. The interface may indicate a subject application selected from applications executing at the distributed computing system. For example, the interface may be provided to a user (e.g., an administrative user) associated with the subject application on a display or monitor used by the user. Through the interface, the user may provide the data flow input module 76 with various descriptions of data flows. For example, the user may identify one or more data flows that are upstream and/or downstream of the subject application. Upstream applications are applications that provide incoming data to the subject application. Downstream applications are applications that receive outgoing data from the subject application. The user, also through the interface, may verify data flows that are identified by other users and/or by the data flow discovery module, as described herein. In some examples, the user may verify a data flow by confirming the data flow, declining the data flow, and/or modifying the data flow.

The data flow tracking module 78 may be programmed to perform various tasks for tracking data flows in the distributed computing system. For example, the flow tracing module 78 may be programmed to identify applications that would be impacted by a data error by (e.g., including a failure of) a subject application or subject data flow, verify that upstream data flows received an application are authoritative (i.e., validated sources for the data flow), etc. The visualization tool 80 may be programmed to provide a user with various graphical user interfaces, as described herein, that illustrate the relationships between data flows and applications. For example, the user may utilize the user interfaces provided by the visualization tool 80 to identify and correct errors in the distributed computing system, verify that the configuration of the distributed computing system is correct or optimal, etc.

Figure 4:
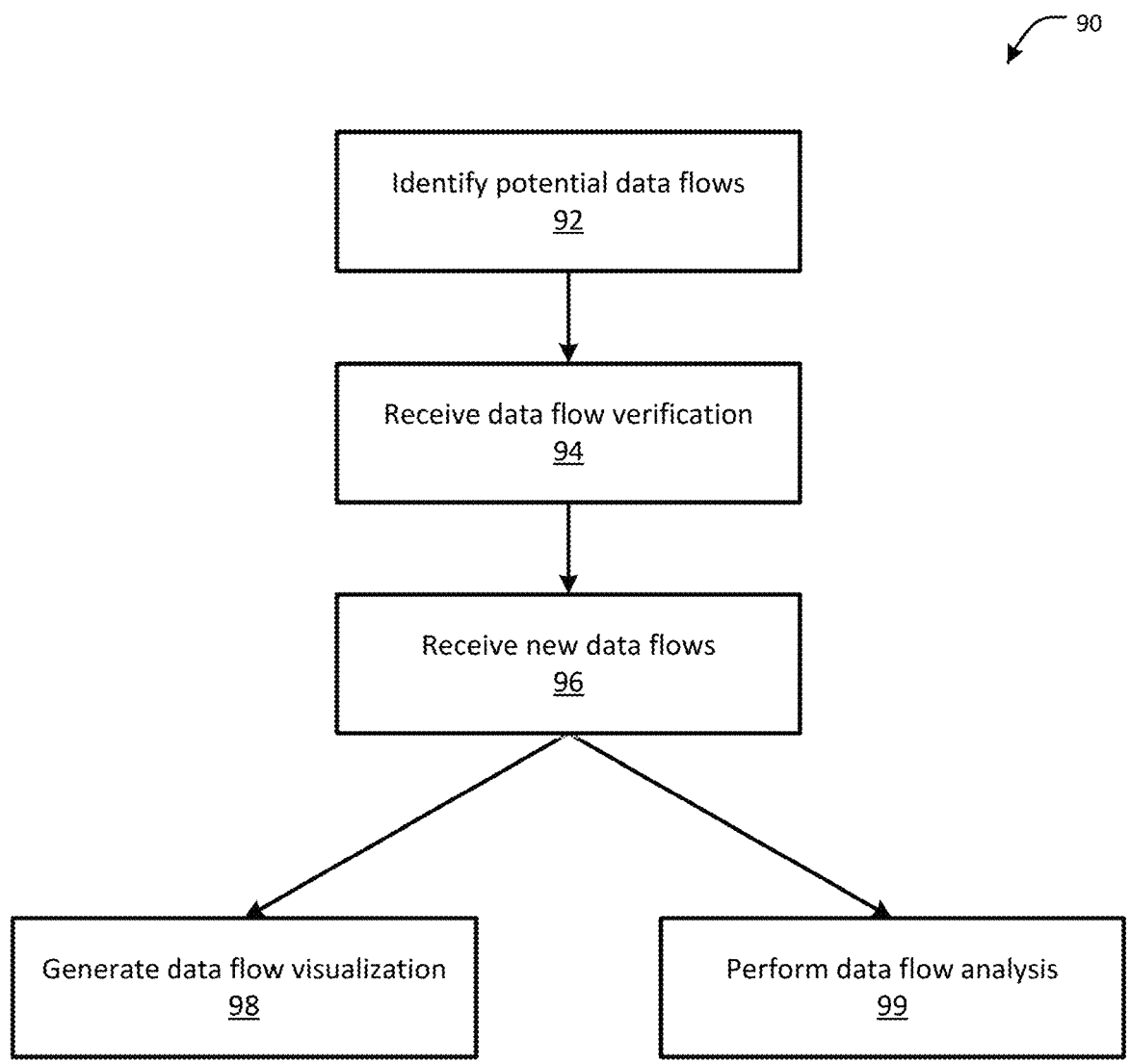
FIG. 4 is a flow chart showing one example of a process flow that may be executed by the data flow tool to track data flows in a distributed computing system, such as the system of FIG. 2.

FIG. 4 is a flow chart showing one example of a process flow 90 that may be executed by the data flow tool 70 to track data flows in a distributed computing system, such as the system of FIG. 2. At step 92, the data flow tool 70 may identify potential data flows (e.g., utilizing the data flow discovery module 74). One example way to identify potential data flows is described herein with reference to FIG. 5. At step 94, the data flow tool 70 (e.g., the data flow input module 76) may receive verification of potential data flows identified at step 92. Example ways to receive verification of potential data flows are described herein, for example, with respect to FIGS. 7-23. At step 96, the data flow tool 70 may receive new data flows. Example ways to receive new data flows are also described herein. In some examples, steps 92 and 94 may be omitted. For example, the data flow tool 70 may track data flows without actively discovering the data flows (e.g., the data flow tool 70 may rely on data flows provided by users at step 96). Also, in some examples, step 96 may be omitted. For example, the data flow tool 70 may track data flows based on the data flows discovered and verified at step 94. Also, optionally and as described herein, the data flow module 70 may receive verification of new data flows identified at step 96. For example, data flows identified relative to a subject application may be verified by users associated with the appropriate downstream and/or upstream applications, as described herein.

Data flows determined as described above with respect to steps 92, 94, and 96 may be used by the data flow tool 70 in any suitable manner. For example, at step 98, the data flow tool 70 (e.g., the visualization tool module 80) may generate data flow visualization interfaces, for example, as described herein. The visualization interfaces may be utilized by users, for example, to trace or track data flows in the distributed computing system, to identify the impact of application data errors in the distributed computing system, etc. Example visualization interfaces are described herein. In addition to or instead of generating visualization interfaces, the data flow tool 70 (e.g., the data flock tracking module 78) may, at step 99, perform data flow analysis. Data flow analysis may include, for example, identifying applications that would be impacted by a data error of a subject application or subject data flow, verifying that upstream data flows received an application are authoritative, etc.

Figure 5:
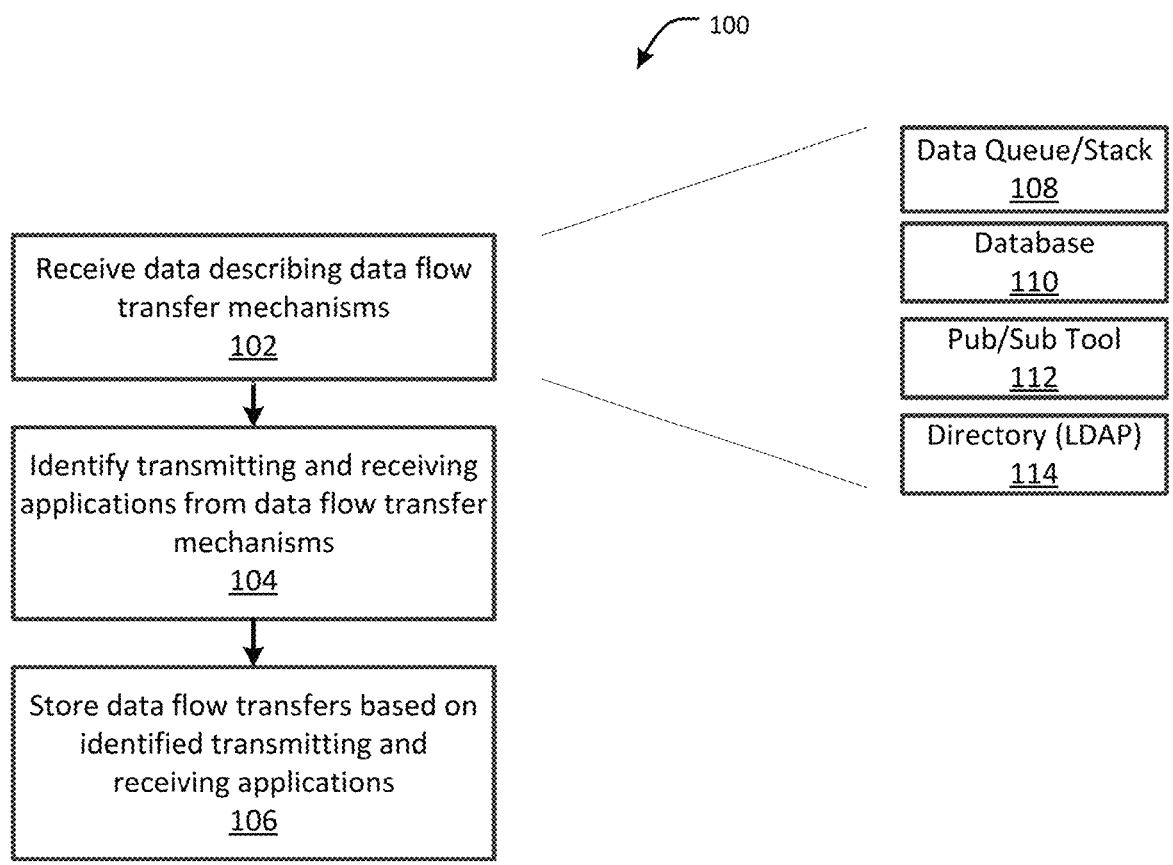
FIG. 5 is a flow chart showing one example of a process flow for identifying potential data flows in a distributed computing system, such as the system of FIG. 2.

FIG. 5 is a flow chart showing one example of a process flow 100 for identifying potential data flows in a distributed computing system, such as the system 50 of FIG. 2. For example, the process flow 100 is one example way that the data flow tool 70 (e.g., the data flow discovery module 74 thereof) may identify potential data flows at step 92 described above with respect to FIG. 4. At step 102, the data flow tool 70 may receive data (e.g., metadata) describing one or more data flow transfer mechanisms in the distributed computing system. Data flow transfer mechanisms may comprise, for example, data queues or data stacks 108, databases 110, pub/sub data services 112, data directories 114, etc., as described herein. Any suitable data flow transfer mechanism may be used in addition to or instead of those shown in FIG. 5 including, for example, batch job dependencies, mainframe (ADABAS) file usage, etc. For example, the data may be data describing applications that write to and/or read from the data flow transfer mechanisms, data describing the data flows written to and/or read from the data flow transfer mechanisms, etc.

At step 104, the data flow tool 70 may identify receiving and transmitting applications for data flows described at step 102. For example, if a first application writes data to a data flow transfer mechanism and a second application reads the data, the data flow tool 70 may identify a potential data flow between the first application and the second application. The potential data flow may be described by the first application, the second application and, in some examples, a description of the data. The description of the data, which may be stored by the data flow tool 70, may include, for example, a data concept type and/or data flow boundary data (e.g., as defined in the business function dictionary 72). In some examples, multiple potential data flows may be identified if more than one application receives the same data from a particular data flow transfer mechanism. For example, referring back to the first and second applications referenced above, if a third application also reads from the data flow transfer tool the data written by the first application, then the data flow tool 70 may identify an additional potential data flow between the first application and the third application. At step 106, the data flow tool 70 may store potential data flows identified at step 104 for later use. The potential data flows may be used in any suitable manner. For example, the potential data flows may be used for data flow tracking, as described herein, and/or for data flow visualization, as described herein. In some examples, the potential data flows may be verified, as described herein.

Figure 6:
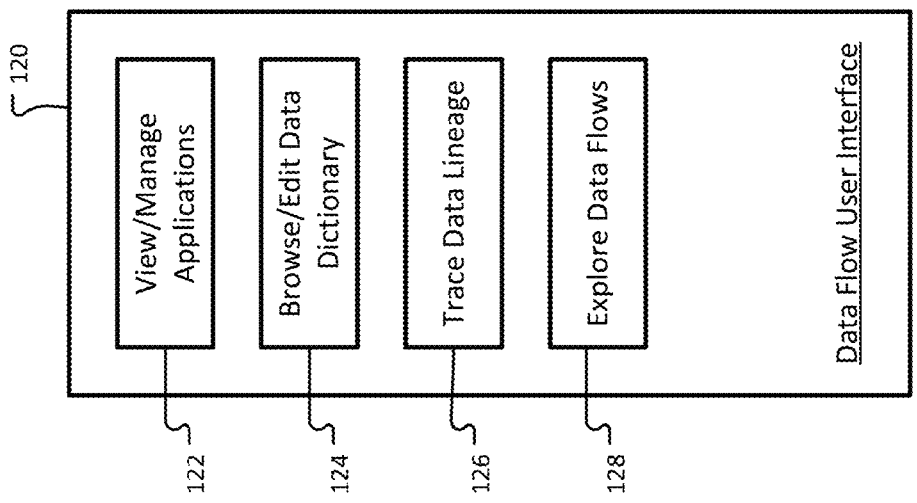
FIG. 6 is a diagram showing one example organization for a data flow user interface.

In some examples, various functionalities of the data flow tool 70 may be accessed via a data flow user interface 120. The user interface may be displayed on any type of suitable display device (e.g., web interface, monitor, laptop, smartphone, etc.) accessible by the user. FIG. 6 is a diagram showing one example organization for the data flow user interface 120. Example interface screens from the data flow user interface 120 are described herein, for example, with respect to FIGS. 8, 10-23, 25-29, 31-36 and 38-41. For example, the data flow user interface 120 may comprise a view/manage applications module 122. The view/manage applications module 122 may comprise interface screens to facilitate the verification of potential data flows and/or the receipt of new data flows by the user. A browse/edit data dictionary module 124 may comprise interface screens for browsing and/or modifying data concept type and/or definitions of boundary data by the user, as described herein. A trace lineage module 126 may comprise interface screens including graphical visualizations for the user of data flow tracking, as described herein. An explore data flow module 128 may comprise user interface screens including additional visualizations of data flow tracking, as described herein, for example, with respect to FIGS. 37-41.

Figure 7:
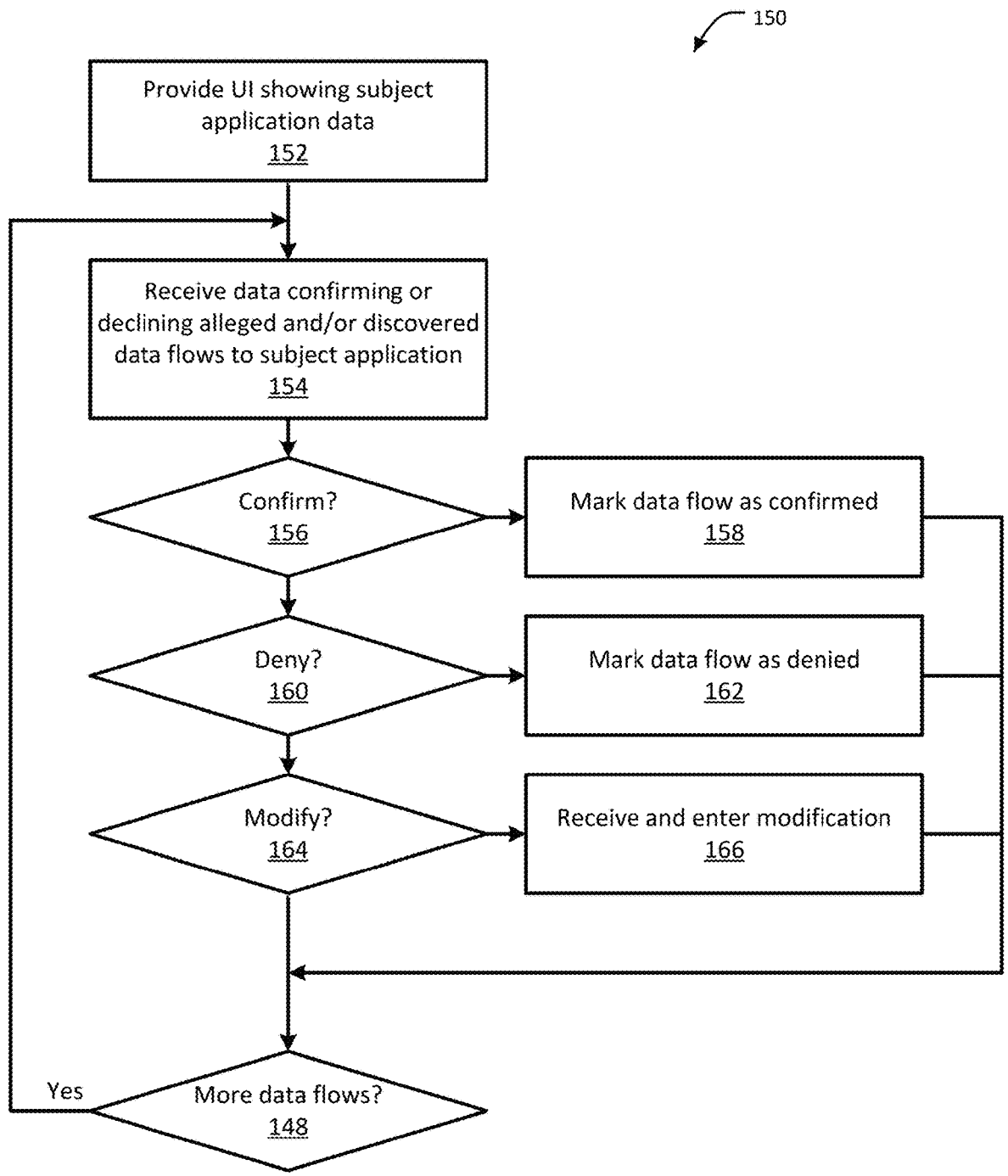
FIG. 7 is a flow chart showing one example of a process flow for verifying potential data flows through the data flow user interface of FIG. 6.
Figure 8:
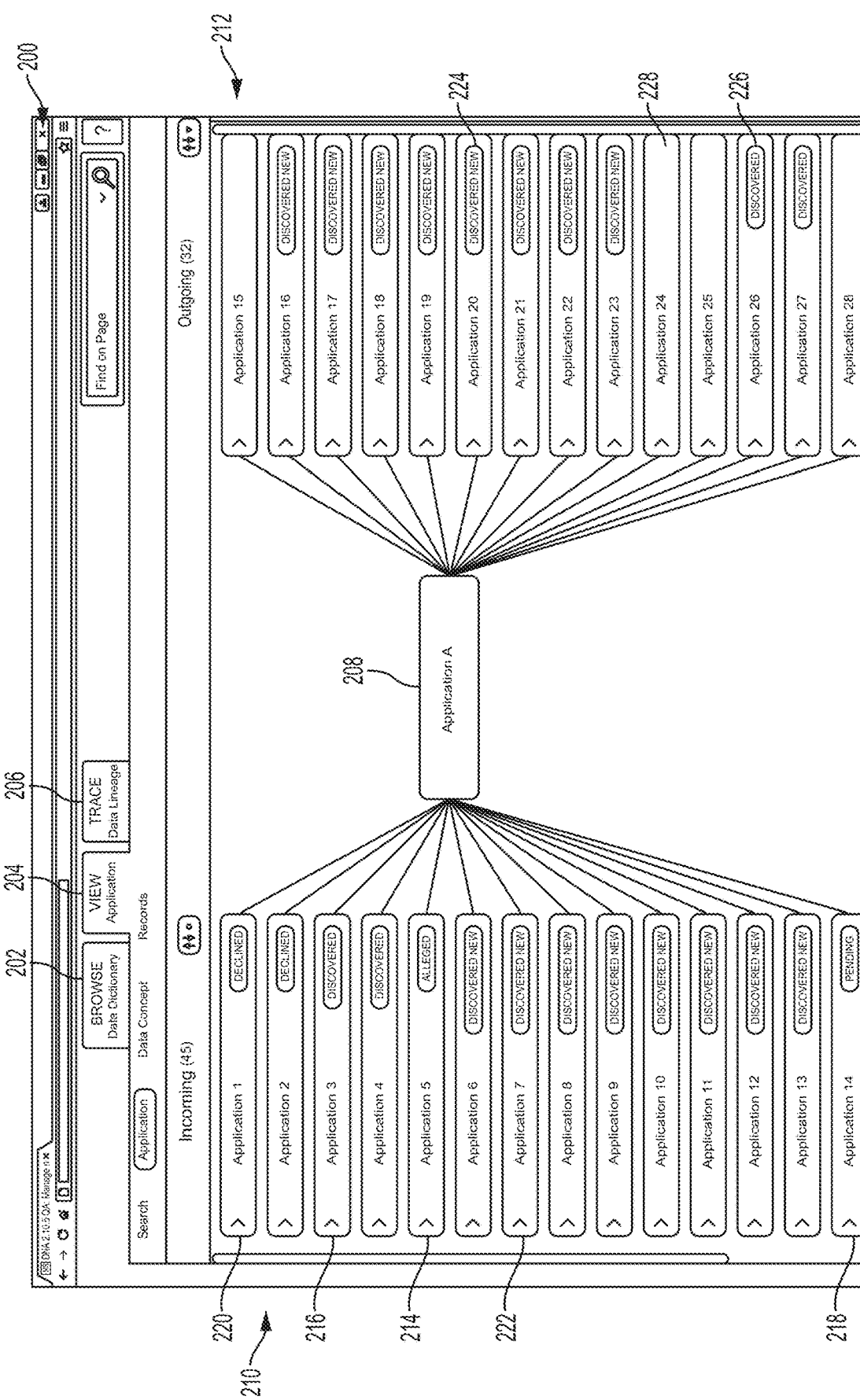
FIG. 8 is screen shot showing one example of a user interface screen that may be provided to a user during the process flow of FIG. 7.

FIG. 7 is a flow chart showing one example of a process flow 150 for analyzing potential data flows, for example, as described herein above with respect to step 94 of FIG. 4. The process flow 150 may be executed by the data flow tool 70 (e.g., the data flow input module 76 thereof) and may utilize the data flow interface (e.g., the view/manage applications module 122) as described herein. At step 152, the data flow tool 70 may provide to a user interface showing data about a subject application to a user. For example, the user interface may comprise a representation of the subject application including upstream and downstream data flows. The user may be a user associated with the subject application (e.g., an administrator or other administrative user of the subject application). FIG. 8 is screen shot showing one example of a user interface screen 200 that may be provided to a user at step 152. For example, the screen 200 may be selected from the data flow user interface 120 (FIG. 6). Screen 200 may correspond to the view/manage applications module 122. The user may select the view/manage applications module 122 by selecting tab 203. The interface 120 may display other modules upon selection of the other tabs. For example, when the user selects the tab 202, the interface 120 may display a screen (not shown in FIG. 8) corresponding to the browse/edit dictionary module 124. When the user selects the tab 206, the interface 120 may display a screen (not shown in FIG. 8) corresponding to the trace data lineage module 126.

In the screen 200, a subject application icon 208 corresponds to the subject (or "focal") application. In the example of FIG. 8, the subject application is called "Application A." An upstream field 210 in a column or field to the left of the subject application comprises icons corresponding to applications providing the subject application 208 with data flows. A downstream field 212 in a column or field to the right comprises icons corresponding to applications that receive data flows from the subject application. In various examples, each icon in the respective fields 210, 212 comprises an indication of a verification status of the corresponding data flow. With the data flow analysis tool, a user can categorize the data flows by verification statutes and generate lists or reports according to the categorization. The data flow analysis tool may use a predetermined set of verification status categories. For example, icon 216 corresponds to an example upstream application called "Application 3". The Application 3 icon 216 is marked "Discovered." This may indicate that the data flow from the Application 3 may have been discovered by the data flow discovery module 74, for example, as described with respect to FIG. 5. An icon 222 corresponds to an upstream application called "Application 7." The Application 7 icon 222 is marked "Discovered New," which may indicate that the data flow corresponding to Application 7 is newly discovered by the data flow discovery module 74 (e.g., discovered since the last time that the user viewed the interface screen 200). An icon 214 corresponds to an upstream application called "Application 5." The icon 214 is marked "Alleged." This may indicate that a user associated with Application 5 has alleged the data flow from Application 5. An icon 218 corresponds to an upstream application called "Application 14." The Application 14 icon 218 is marked "Pending." This may indicate that the user has entered the data flow from Application 14 as a potential data flow. The potential data flow may be updated to an actual data flow when verified and/or confirmed by a user associated with Application 14. An icon 220 corresponds to an application called "Application 1." The Application 1 icon 220 is marked "Declined." This may indicate that another party (e.g., the data flow discovery module 74 and/or a user associated with Application 1), alleged the existence of a potential data flow between Application 1 and Application A (icon 208), but the user associated with Application A declined the potential data flow, e.g., indicating that there is no data flow between the applications and/or the potential data flow was incorrect. In some examples, the "Declined" marker may indicate that the user associated with Application A proposed the data flow while the user associated with Application 1 declined it. Icons 224, 226 in the downstream field 212 may be similarly labeled, with the labels having similar meanings. These various verification statuses indicate the status of agreement as to the nature of the nature of the data flow for the subject application among the various users of the system and the system itself.

Also, with respect to FIG. 8, if the subject or focal application (e.g., Application A in FIG. 8) has no upstream applications, then no upstream applications would be shown to the left of the subject/focal application. This might be the case where the subject/focal application is an original source of a data flow. Similarly, if the subject/focal has no downstream applications, then no downstream applications would be shown to the right of the subject/focal application. This might be the case where no other applications use data from the subject/focal application.

Referring back to FIG. 7, at step 154, the data flow tool 70 may receive data confirming or declining an alleged and/or discovered data flow. For example, the user may select an icon, such as 214, 216, 222, 224, 226 associated with an upstream or downstream application that is either alleged to be part of a data flow to or from the subject application (e.g., 214) or has been discovered as a potential data flow (e.g., 216, 222, 218, 224, 226). The data flow tool 70 may determine at step 156 whether the user has confirmed the data flow, indicating that the user agrees that the subject application receives or provides the data flow (depending on whether the data flow is upstream or downstream). If so, the data flow tool 70 may mark the data flow as confirmed. Referring to FIG. 8, an example icon 228 corresponding to a downstream application called "Application 24" has been marked as confirmed, for example, by removing indications of another status. If the user has not confirmed the data flow at step 156, the data flow tool 70 may, at step 160, determine if the user has declined the data flow. If so, the data flow tool 70 may, at step 162, mark the data flow as declined, for example, as indicated at icon 220 described above (FIG. 8). At step 164, the data flow tool 70 may determine if the user has modified the data flow. If so, the data flow tool 70 may, at step 166, mark the data flow as pending, similar to icon 218. The data flow may remain pending until a user associated with the other upstream or downstream application involved in the data stream has accepted, declined, or modified the data stream. At step 168, the data flow tool 70 may determine if additional (uncategorized) data flows remain. If so, the process flow may return to step 154.

Figure 9:
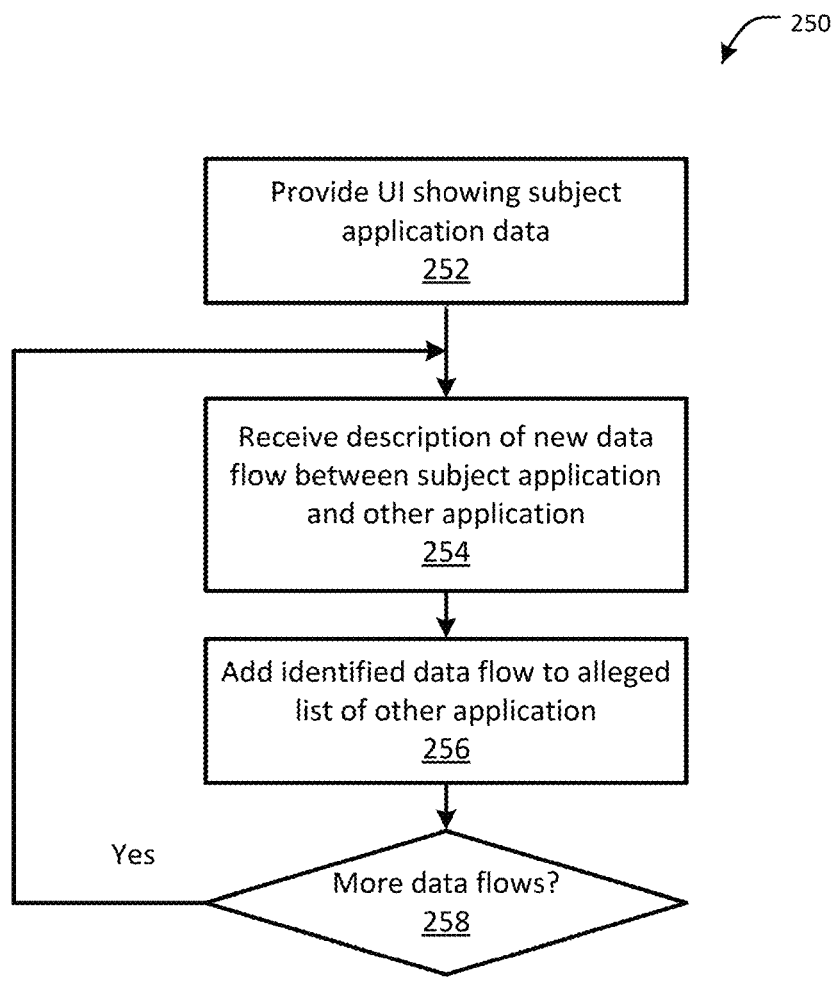
FIG. 9 is a flow chart showing one example of a process flow for adding new data flows to an application through the data flow user interface of FIG. 6.

FIG. 9 is a flow chart showing one example of a process flow 250 for adding new data flows to an application through the data flow user interface 120 of FIG. 6 (e.g., the view/manage applications module 122). For example, the process flow 250 may be executed by the data flow tool 70 (e.g., the data flow input module 76 and/or visualization tool module 80). At step 252, the data flow tool 70 may provide a user with a user interface describing a subject application, for example, similar to the interface screen 200 described above. The user may be a user associated with the subject application (e.g., an administrator or other administrative user of the subject application). At step 254, the data flow tool 70 may receive, through the user interface, a description of a new data flow either upstream to or downstream from the subject application. For example, the data flow tool 70 may receive for the data flow a data concept type (e.g., selected from the business function dictionary 72). In some examples, the data flow tool 70 may also receive data flow boundary data. At step 256, the data flow tool 70 may add the received data flow to an alleged list of another application (the upstream application originating the data flow if the data flow is upstream or the downstream application receiving the data flow if the data flow is downstream). For example, the data flow may remain in an alleged state until confirmed and/or verified by a user associated with the other application, for example, as described herein with respect to FIG. 7. At step 258, the data flow tool 70 may determine if the user will provide an additional data flows. If so, the process flow may return to step 254 where the data flow tool 70 may receive an additional data flow.

Figure 10:
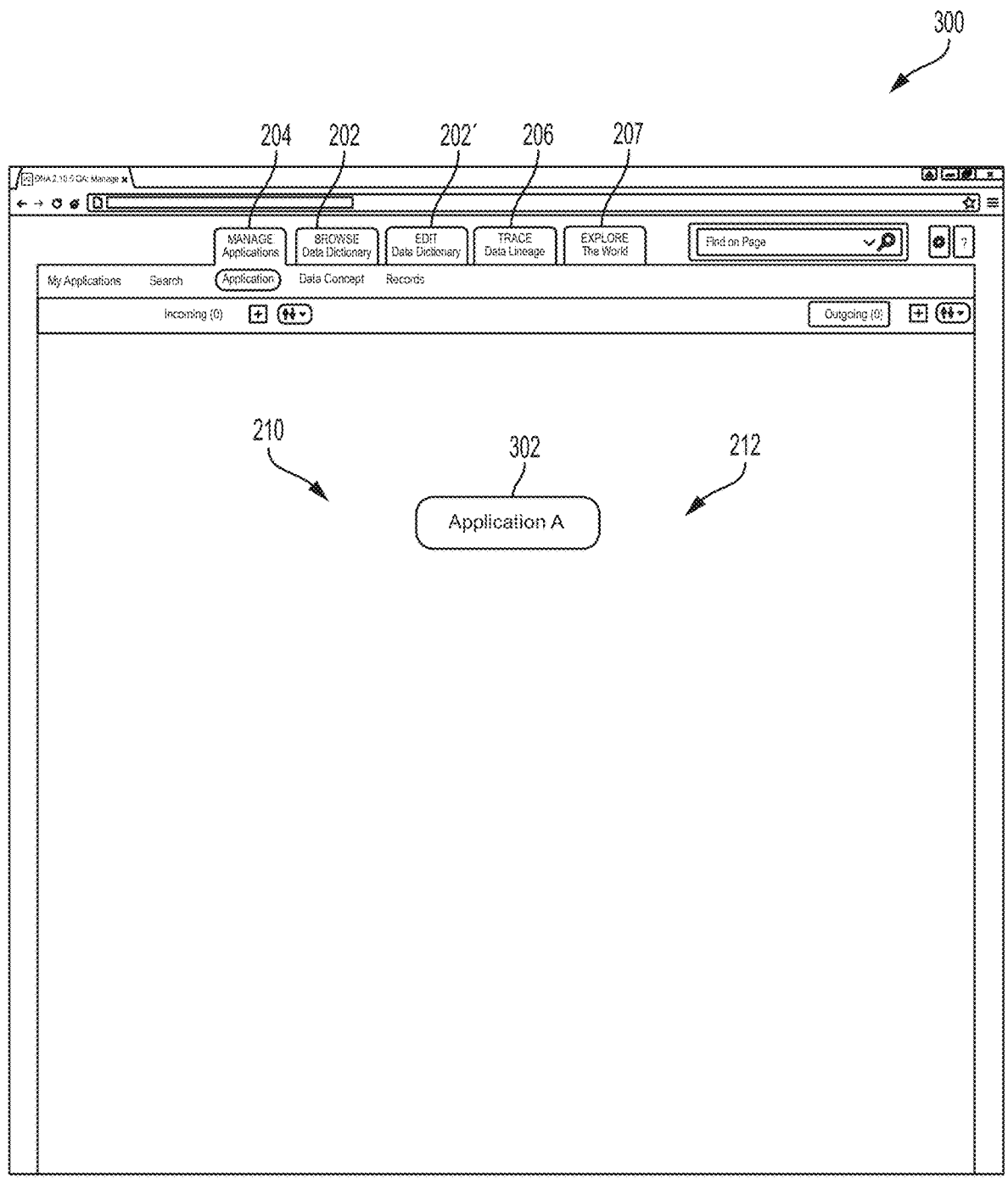
FIGS. 10-23 are screen shots showing one example of a user interface screen 300 that may be provided to a user (e.g., a user associated with a subject application, such as an administrative user for adding a data flow, as described with respect to FIG. 9.

FIGS. 10-23 are screen shots showing one example of a GUI screen 300 that may be provided to a user (e.g., a user associated with a subject application, such as an administrative user) for adding a data flow, as described with respect to FIG. 9. Referring to FIG. 10, the screen 300 comprises tabs 202, 202', 204, 206, 207 that may be selected to display screens related to various modules 122, 124, 126, 128 of the data flow interface 120. For example, tab 204 is selected to display the screen 300 from the view/manage application module 122. Tabs 202 and 202' may be selected to display a screen or screens from the browse/edit data dictionary module 124. For example, tab 202 may be selected to display a screen for browsing the data dictionary while tab 202' may be selected to display a screen for editing the data dictionary. Tab 206 may be selected to display a screen from the trace data lineage module 126 while tab 207 may be selected to display a screen from the explore data flows module 128.

Figure 11:
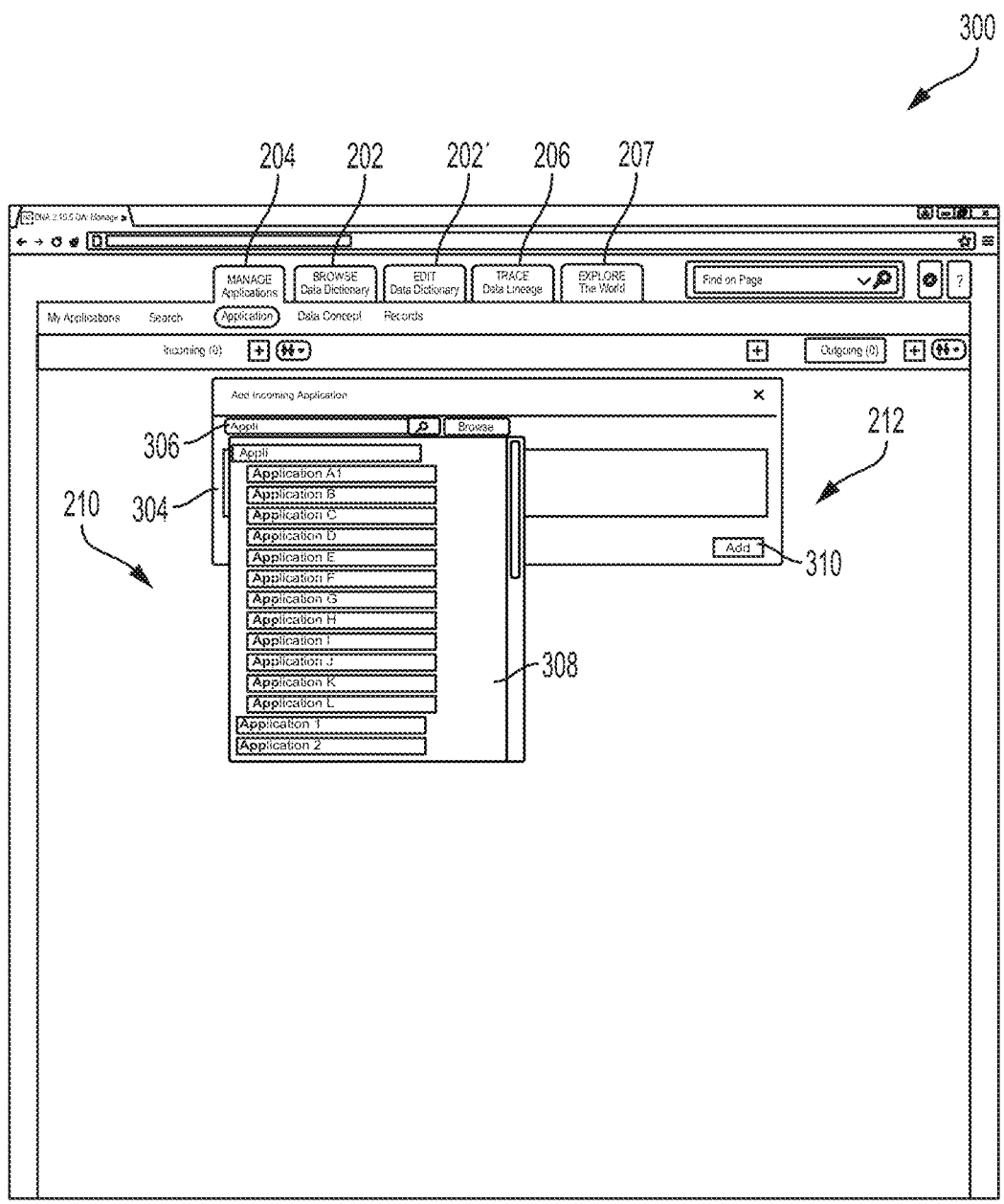
Figure 12:
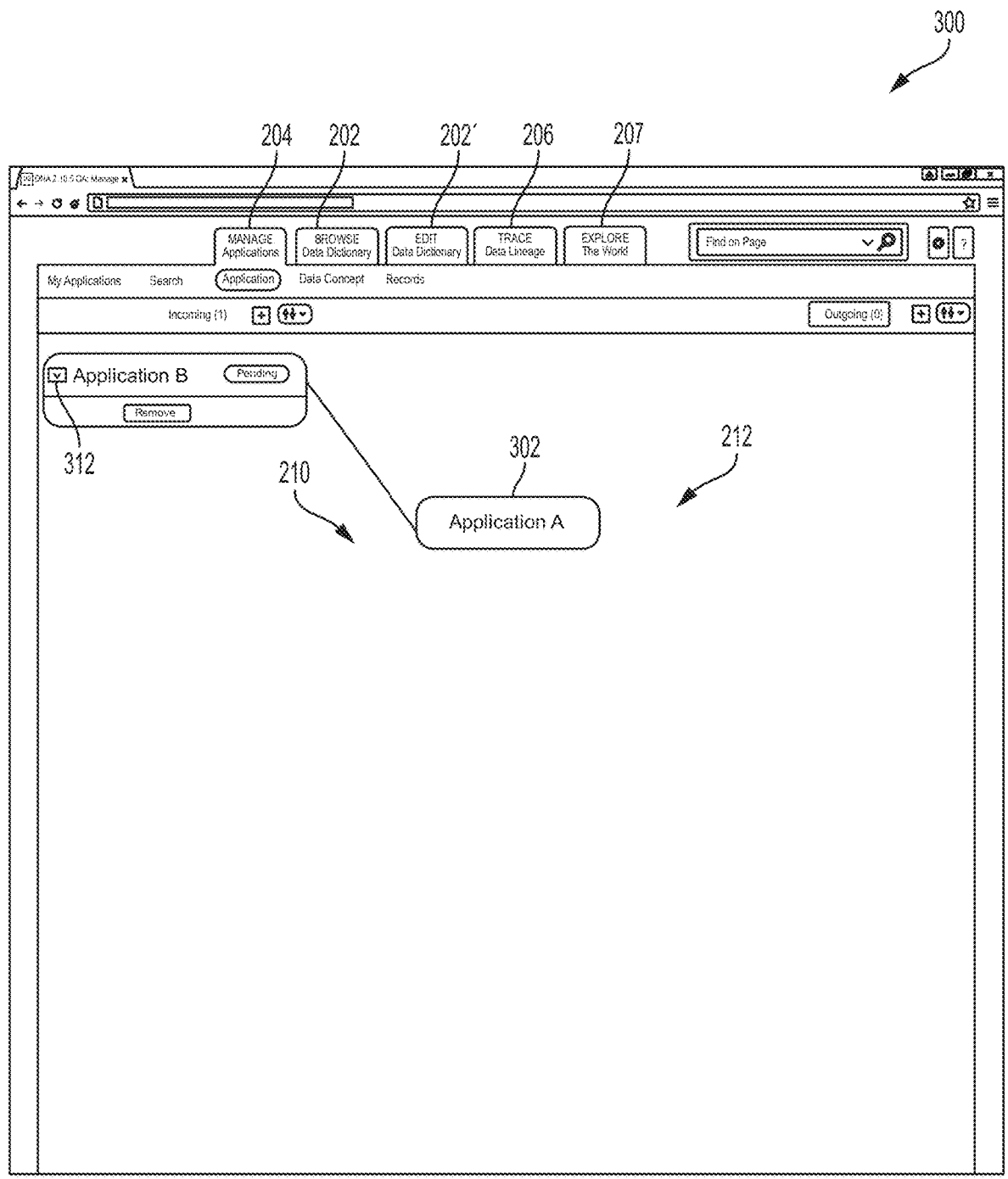
Figure 13:
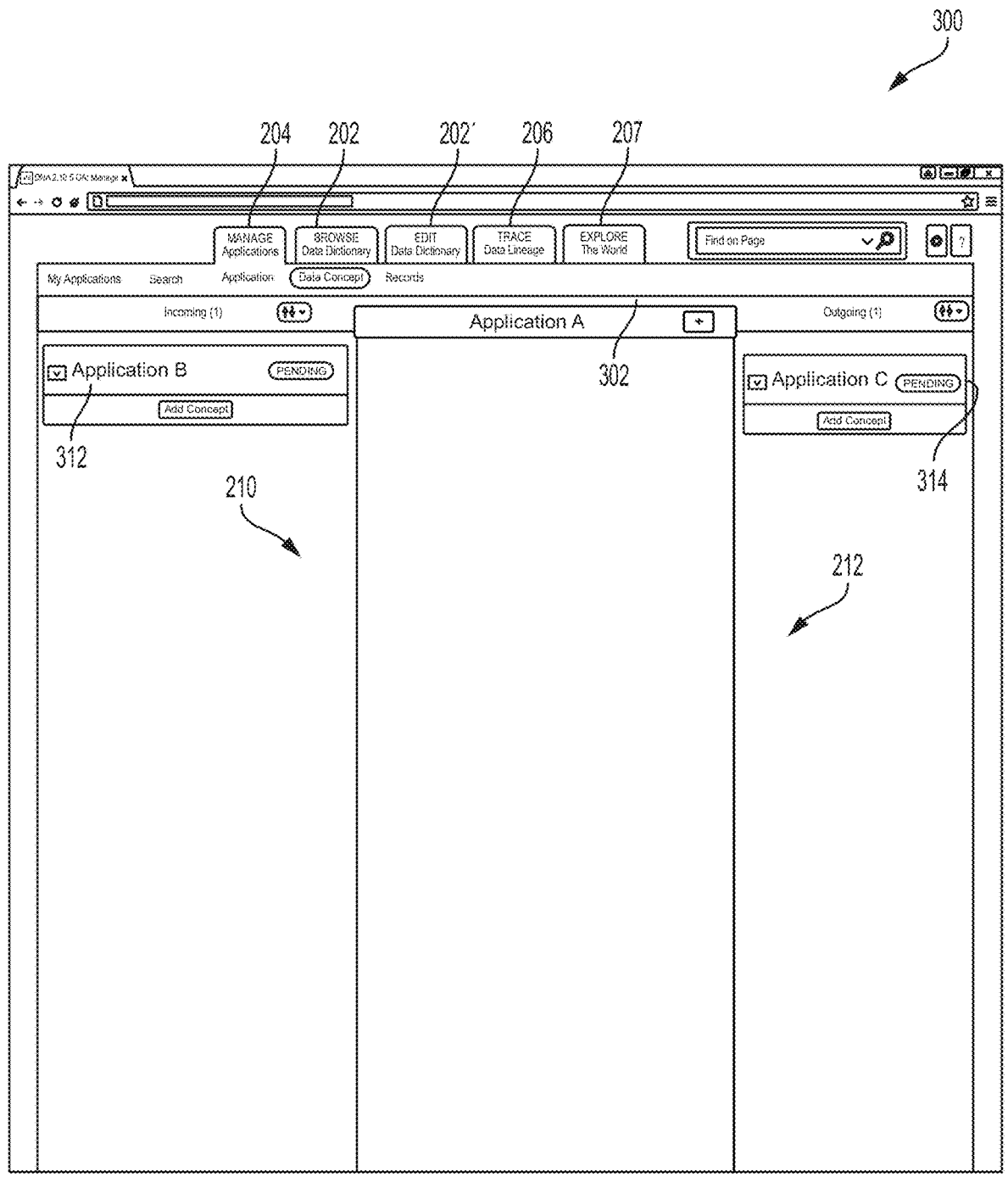

The screen 300, similar to the screen 200 described above, comprises an upstream or incoming field 210 and a downstream or outgoing field 212. The fields 210, 212 are not yet populated in the example of FIG. 10. A subject application icon 302 shown in FIG. 10 denotes a subject application called "Application A." In FIG. 11, the screen 300 is shown with an "Add Incoming Application" field 304. In FIG. 11, the field 304 is positioned over the subject application icon 302, although other examples may place the field 304 at a different location. The user may select from the field 304 an upstream or incoming application that provides the subject application with an upstream or incoming data flow. The field 304 may comprise a text box 306 where the user may type an indication of an upstream or incoming application. In some examples, the interface 120 may provide a drop down field 308 from which the user may select the upstream application. When an upstream application is selected, the user may select the add button 310. Upon selection of the add button 310, a new upstream application icon 312 may be added to the screen 300, as shown in FIG. 12. FIG. 13 shows the screen 300 after a similar outgoing or downstream application icon 314 has been added. The downstream icon 314 may be added in a manner similar to that shown for the icon 312 in FIG. 11.

Figure 14:
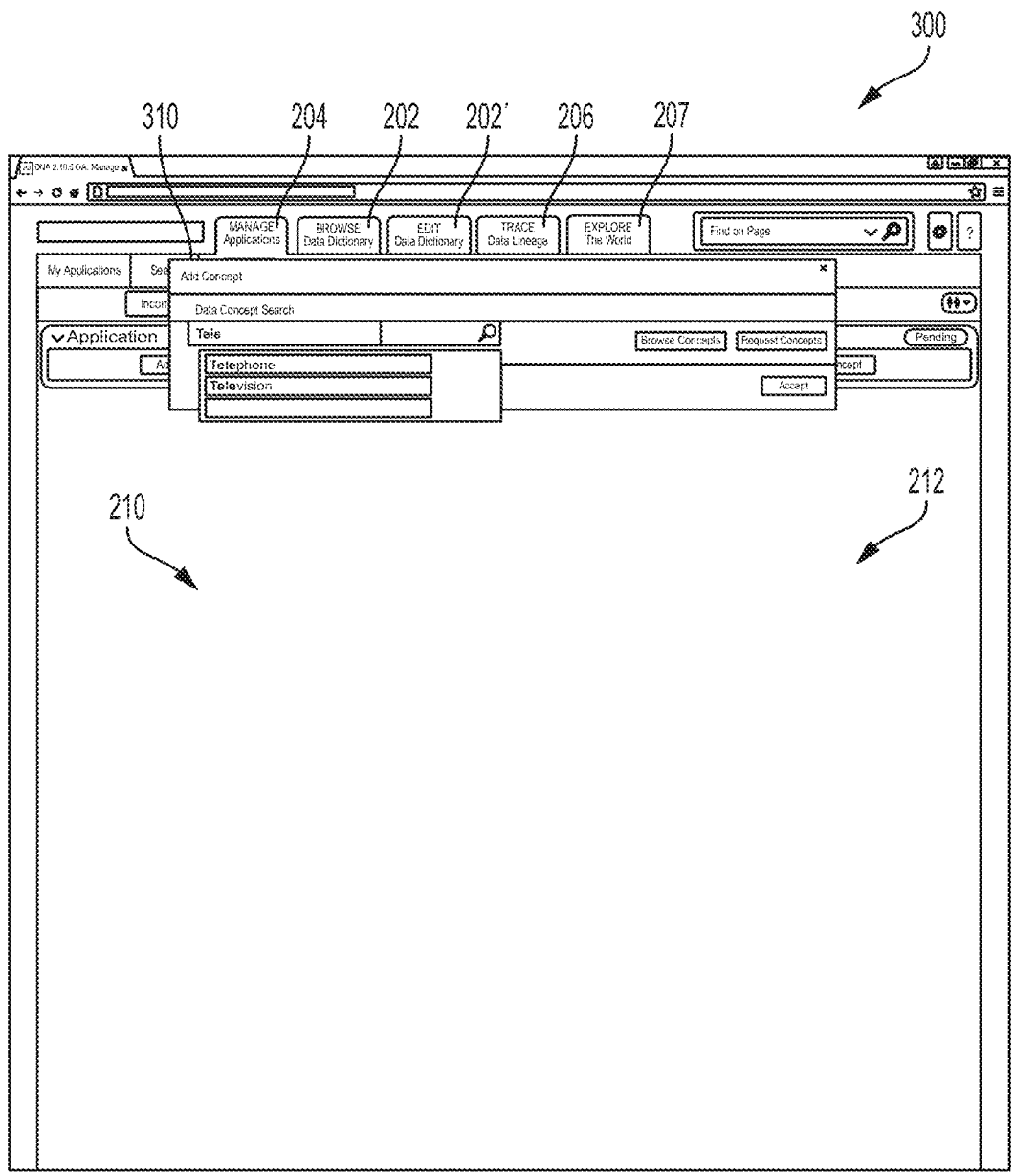

Upon adding an upstream or downstream application, the user may characterize a data stream associated with the application, for example, by selecting an Add Concept button 318 at the icons 312, 314. Selecting the Add Concept button may allow the user to specify a data concept type associated with the data flow from the relevant application. For example a data concept type, when associated with a data flow, may characterize a type of the data in the data flow (e.g., a business function of the data flow). Data flows may include a single data concept type. In some examples, some or all data flows may include multiple data concept types. For example, a single data flow transfer mechanism may be used to transmit more than one data concept type between the same two applications. Selecting an Add Concept button may launch an Add Concept field 316 (FIG. 14). The Add Concept field 316 may comprise a field for receiving a data concept type. In some examples, the Add Concept field 316 may be configured to auto-fill a remainder of the data stream type. In some examples, the Add Concept field may have a Browse Concepts button that, when selected, may launch the browse/edit dictionary module 124 of the interface 120, as described herein. For example, the data concept type or types for the selected data flow may be selected from the dictionary. A Request Concept button may be selected to allow the user to select a new data concept type (e.g., a new data concept type not currently in the dictionary module 124).

Figure 15:
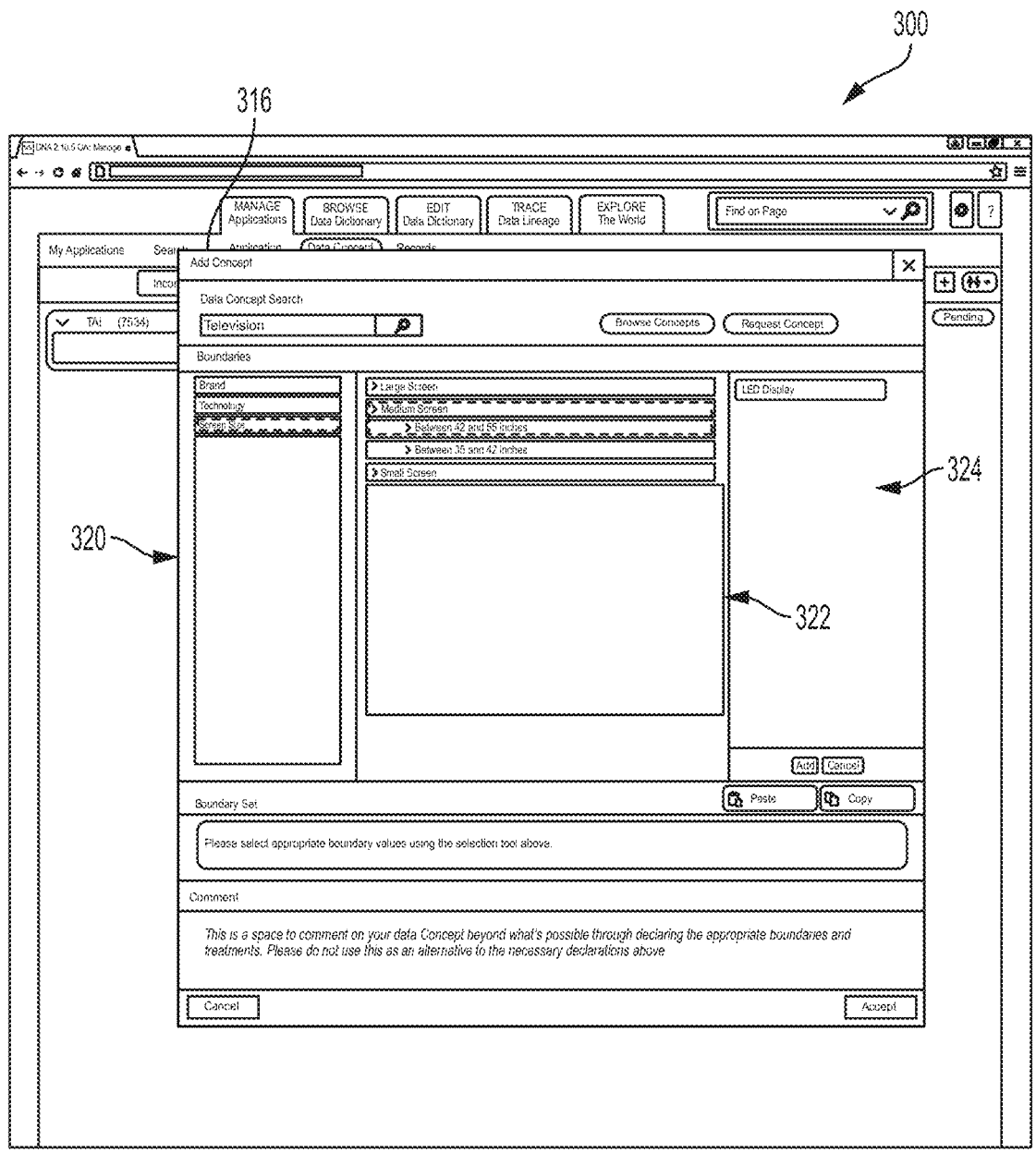
Figure 16:
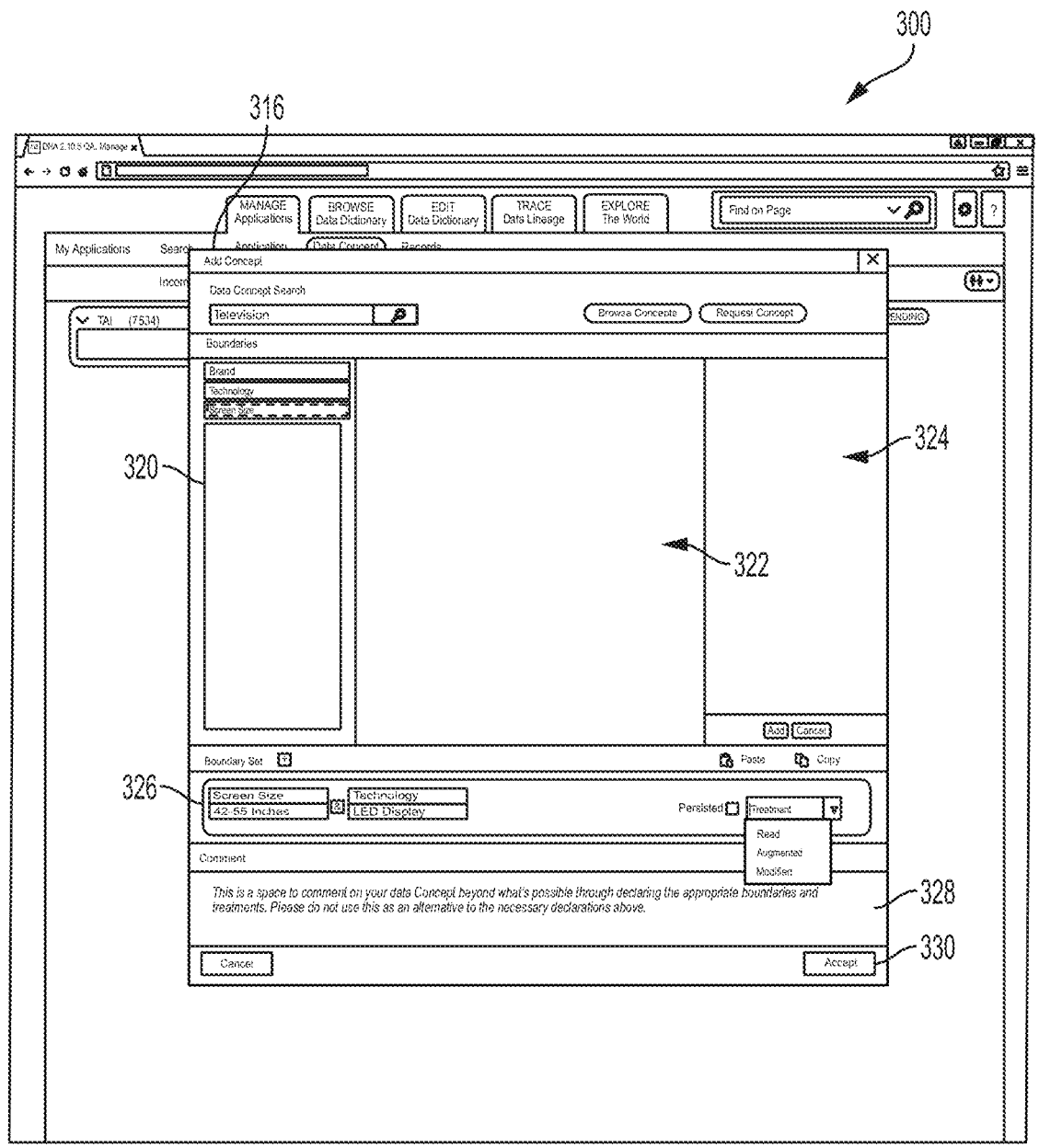
Figure 17:
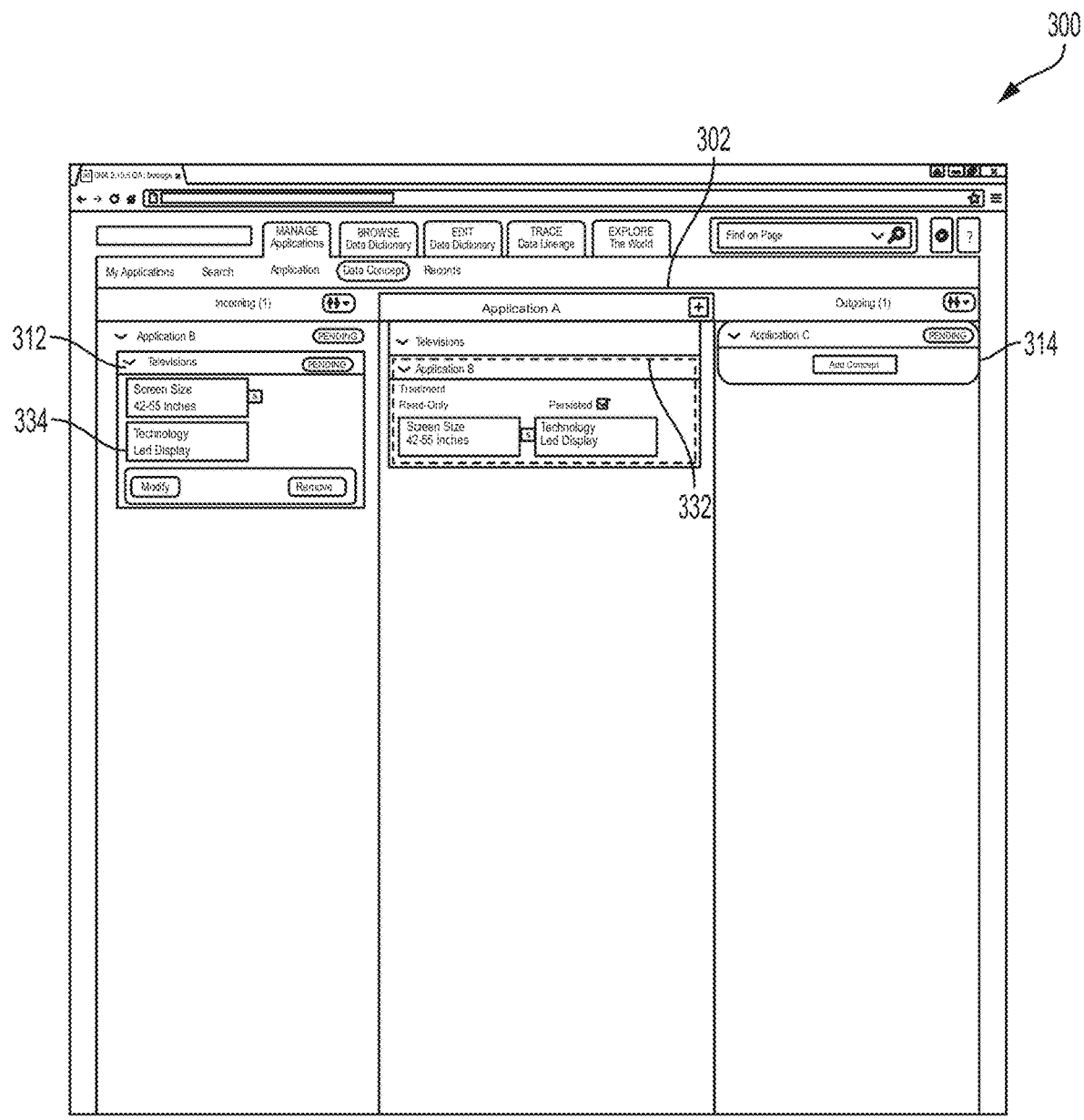

When a data concept type is selected, the Add Concept field 316 may display a boundary field 318 from which the user may select boundaries for the data flow (FIG. 15). As illustrated in FIG. 15, a boundaries category field 320 may list categories of boundaries that may characterize a data flow. A boundary field 322 may list boundaries under the category selected at the boundaries category field 320. The examples of the interface screen 300 described herein may relate to a retailer. For example, each application (Application A, B, etc.) may relate to a shipping port and/or retailer location and the data concept types relate to types of products that may be available for distribution or purchase. In the example of FIG. 15, the selected data concept type is "Television." The boundary category "Screen Sizes" is selected. Different screen sizes are displayed at the boundary field 322. The "Medium Screen—Between 42 and 55 inches" is selected. This may indicate that the data flow from the upstream application indicated by icon 318 relates to televisions (e.g., televisions in stock at a retailer) that have screen sizes between 42 and 55 inches. Selected boundaries may be displayed at a selected boundary field 324. For example, in FIG. 15, the user has previously selected a boundary indicating televisions that have a light emitting diode (LED) display. The user may select the Add button at the field 324 to add boundaries listed at the selected boundary field 324 to the data flow. Boundaries that have been added to a data flow may be displayed at a boundary set field 326 (FIG. 16). For example, FIG. 16 shows an example where the user has selected a boundary "42-55 Inches" of the category "Screen Size" and a boundary "LED Display" the category "Technology." The user may accept these boundaries for the selected data flow, for example, by selecting the Accept button 330. FIG. 17 shows one example of the interface 300 where the boundary data from Application B (icon 312) have been accepted. For example, the icon 312 may comprise a data flow field 334 listing the data concept type and any selected boundaries. The subject application icon 302 may also comprise a data flow field 332 for the data flow listing the data concept type and boundary data. The user can also select applicable attribute dates for the selected data concept type via the GUI. Using an "Add Attribute" field (not shown), the user could select applicable data attributes for the selected concept type. The list of possible attributes from which to select may be pre-populated based on the selected concept type. The attributes may relate to parameters of the selected concept type. In the field of financial services, the attributes may include parameters such as price, date, currencies, value amounts, etc. The user may select one or more applicable attributes.

Figure 18:
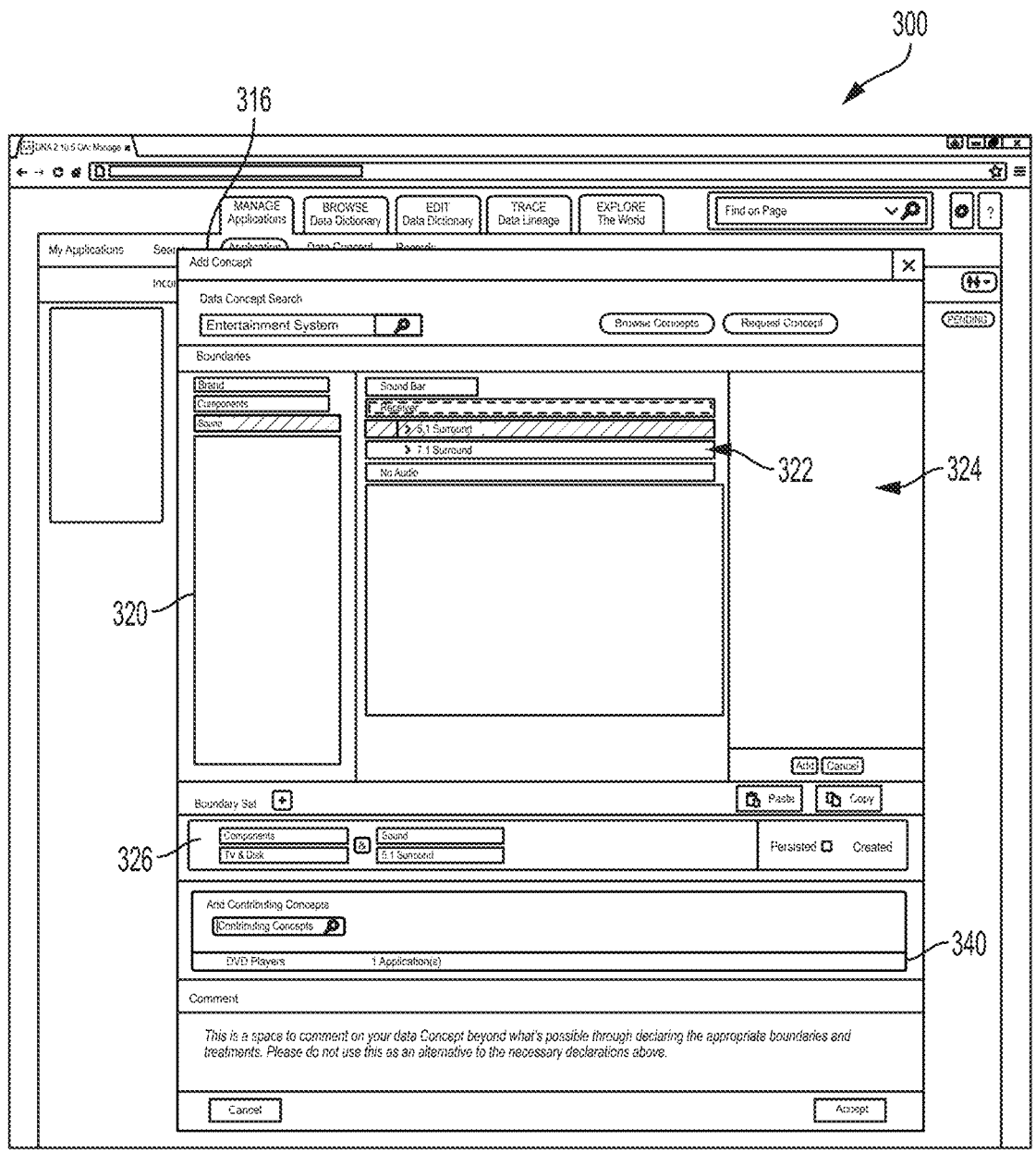
Figure 19:
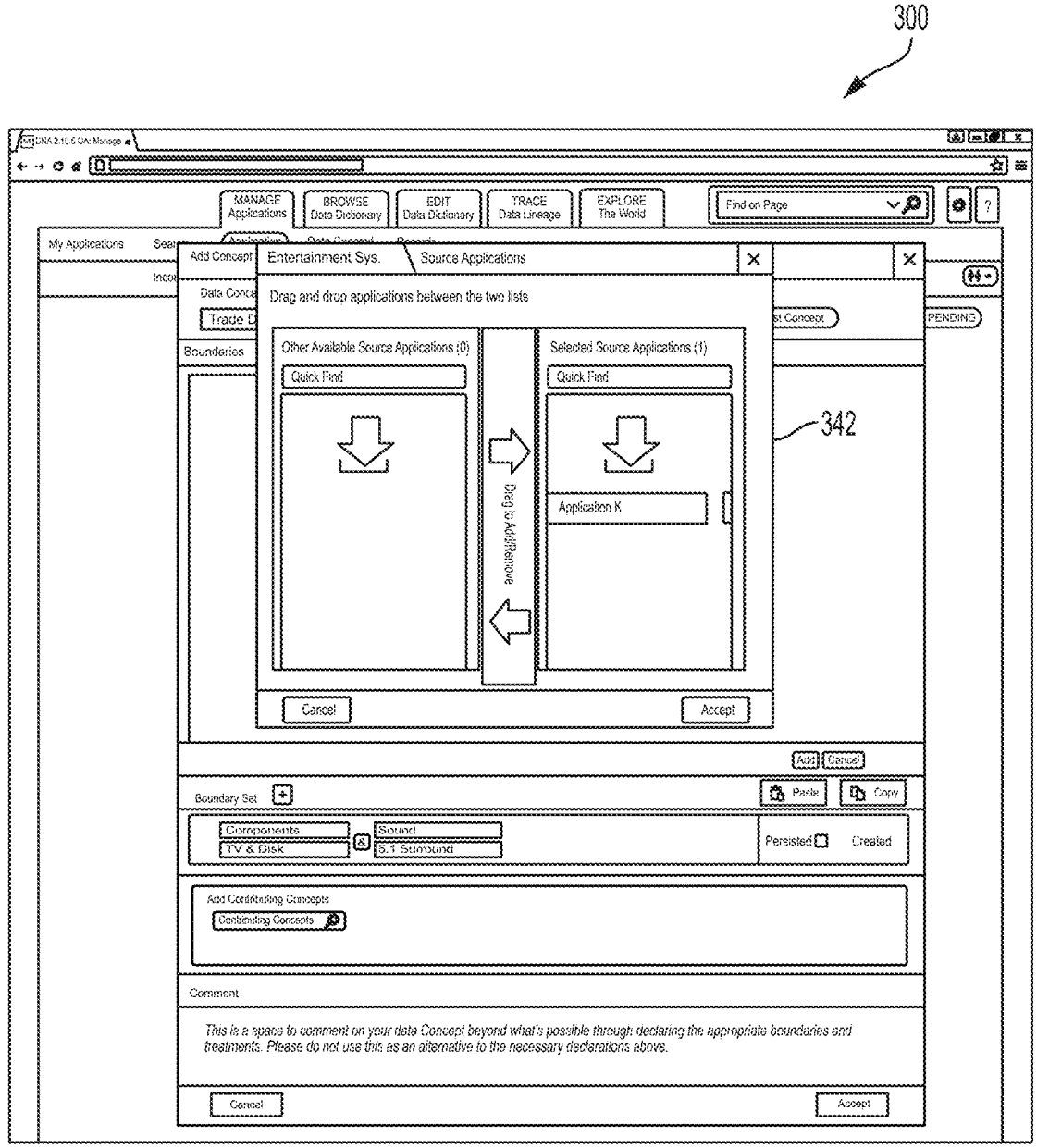
Figure 20:
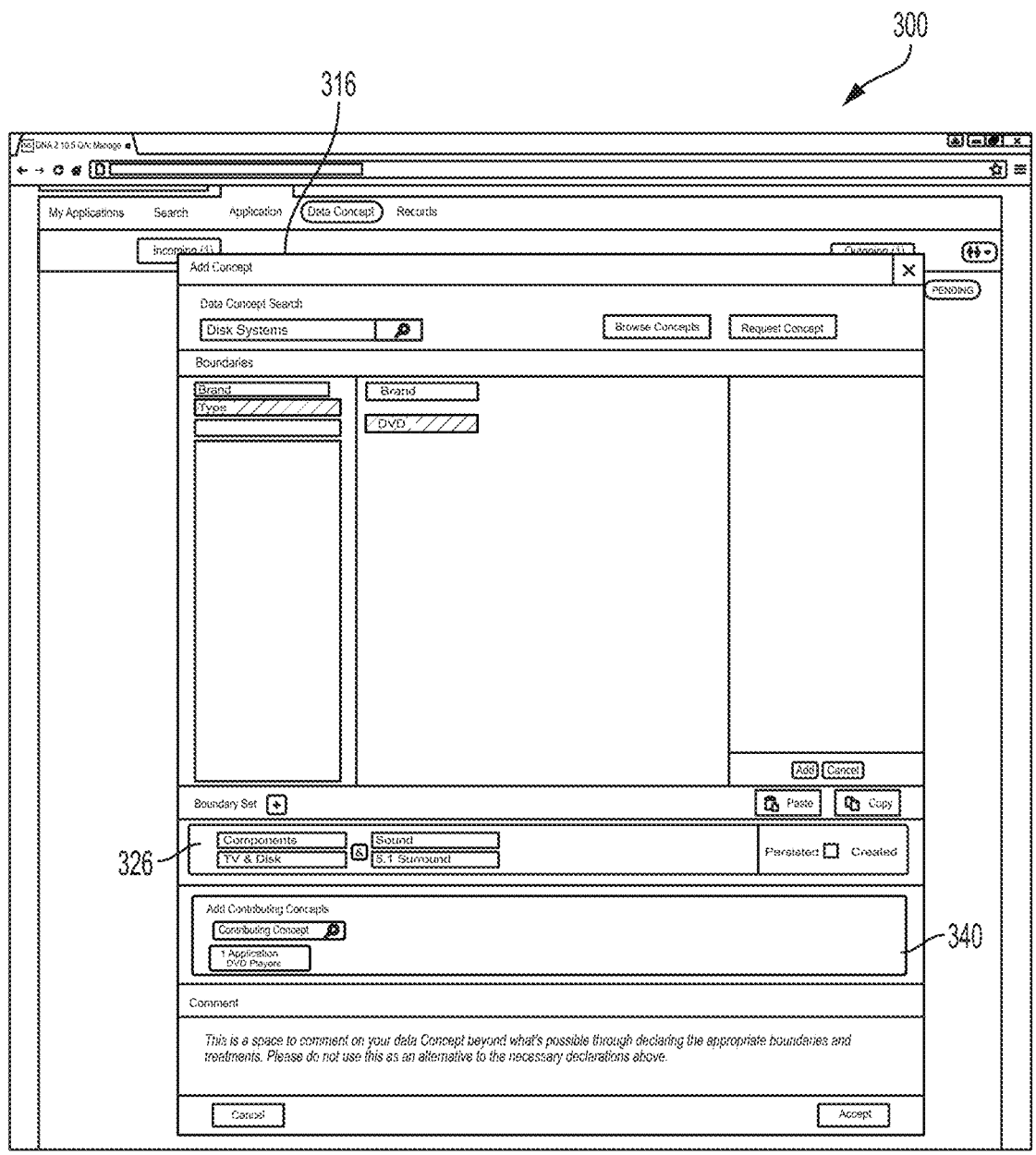
Figure 21:
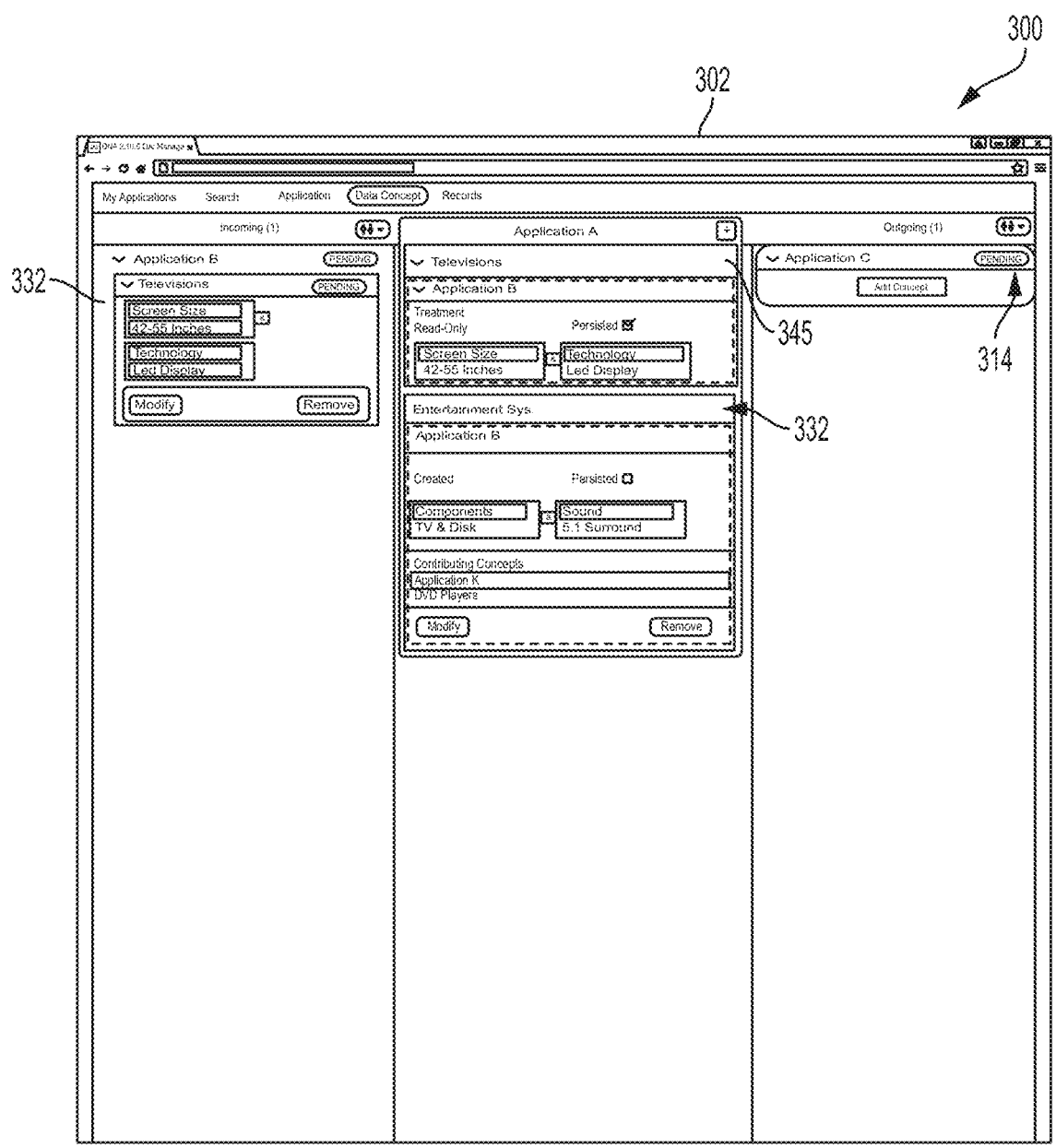
Figure 22:
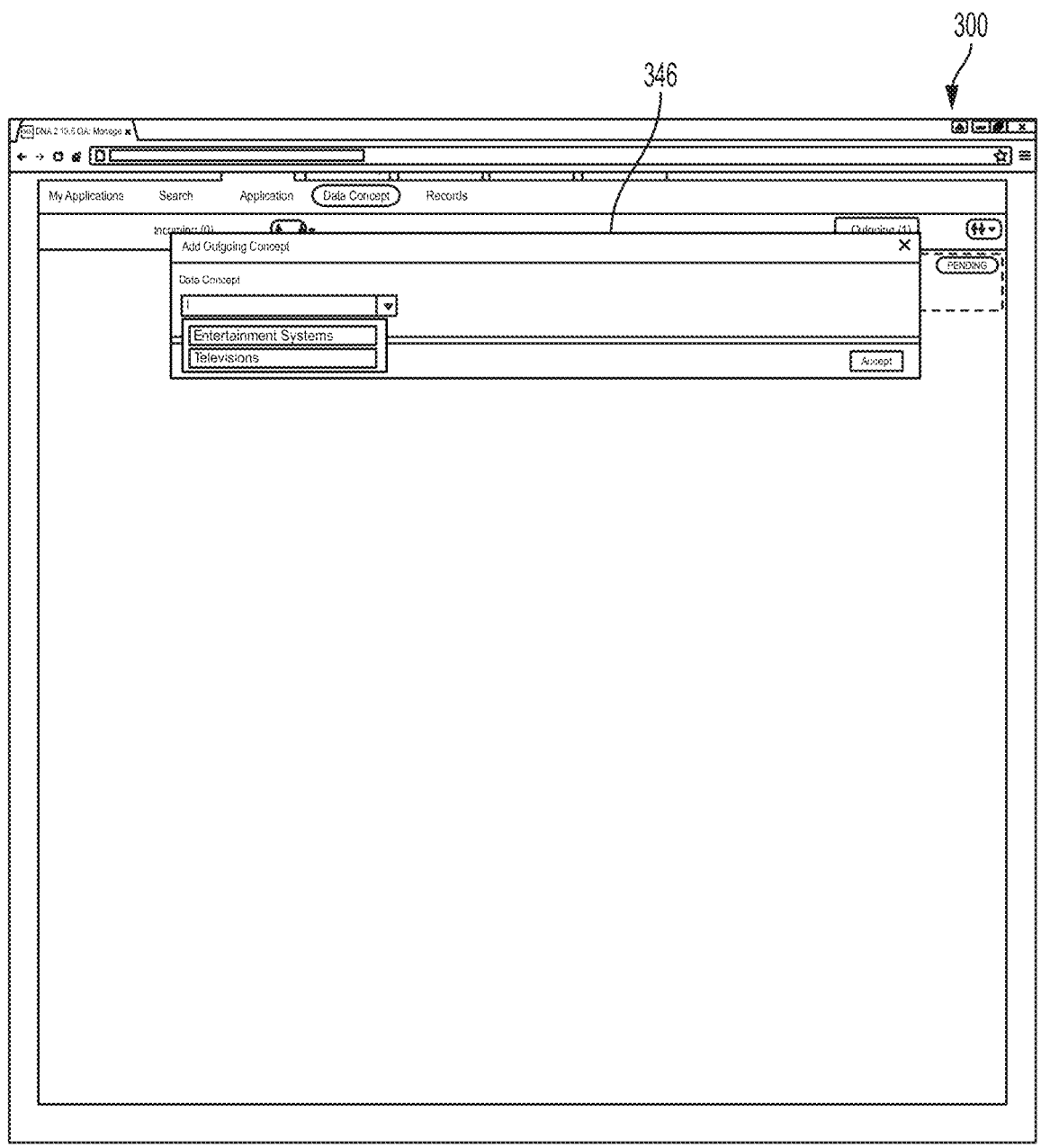
Figure 23:
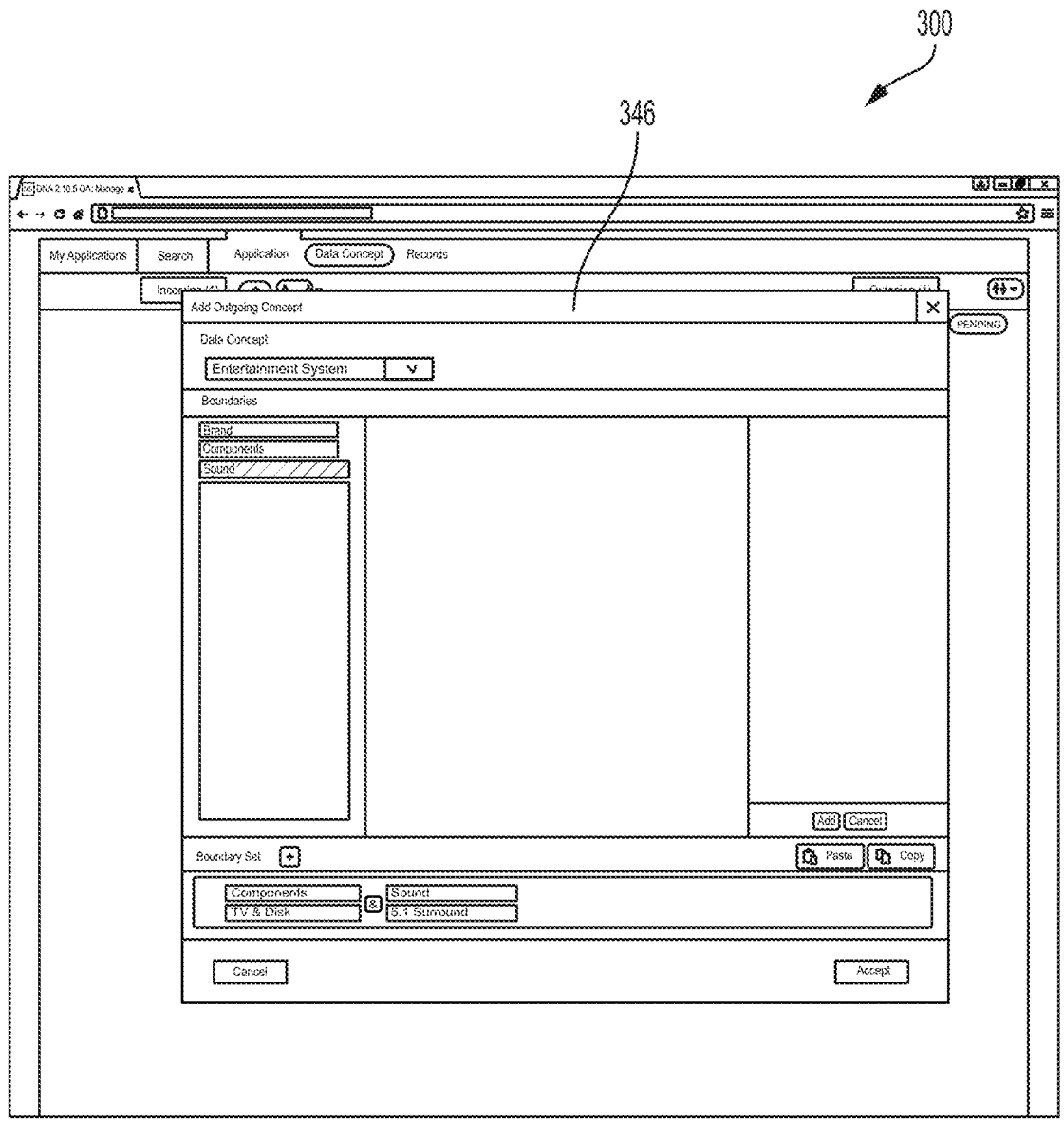

FIG. 18 shows an example of the screen 300 where the Add Concept field 316 comprises an Add Contributing Concept field 340 where the user may add to the data flow a contributing data concept type. A contributing data concept type may be a data flow (e.g., from another application that is used by the upstream application) to create a data flow. For example, a contributing data concept type may be a data concept type received from an application upstream of the upstream data flow. In the example of FIG. 19, the data concept type "Entertainment System" is provided along with a contributing data concept type "DVD Players" listed at Add Contributing Concept field 340. For example, the number of Entertainment Systems actually available for shipping may depend on the number of DVD players that are designated for individual sale (e.g., not as part of an Entertainment System). Accordingly, Application B may receive a data flow having data of the data concept type DVD Players to generate the data flow of data concept type Entertainment Systems. FIG. 19 shows a contributing application field 342, which may be configured to receive an indication of an application that is the source of a contributing data concept type (e.g., Application K). FIG. 20 shows the Add Contributing Concept field 340 reflecting the selected contributing data concept type DVD Players and source application. FIG. 21 shows the screen 300 after a data flow with the contributing data concept type shown at FIGS. 18-20 has been accepted. For example, the subject application icon 302 may comprise a contributing data concept type field 345 listing details of the contributing data concept type. FIGS. 22 and 23 show the screen 300 including an Add Outgoing Concept field 346 for receiving data describing an outgoing data flow. The Add Outgoing Concept field 346 may operate in a manner similar to that of the Add Concept field 316 described herein.

Figure 24:
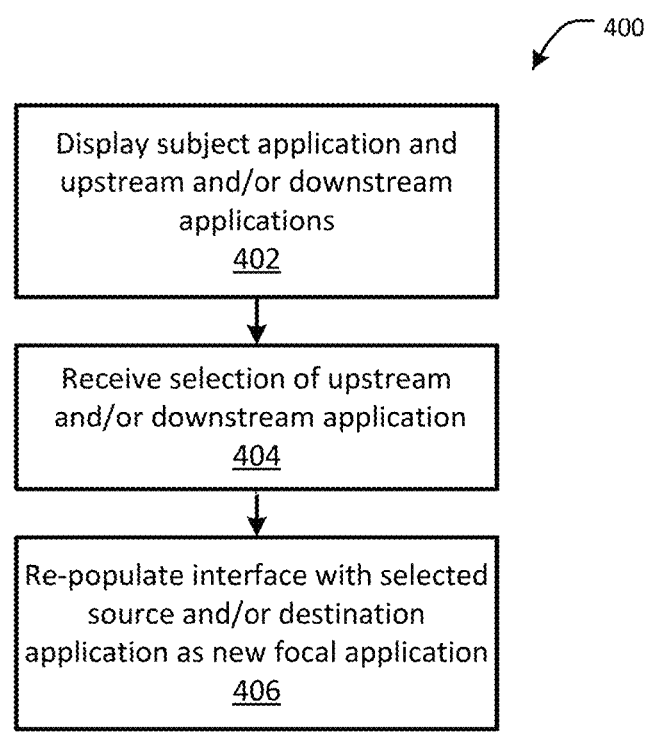
FIG. 24 is a flow chart showing one example of a process flow for modifying the user interface screen to show a new subject application.
Figure 25:
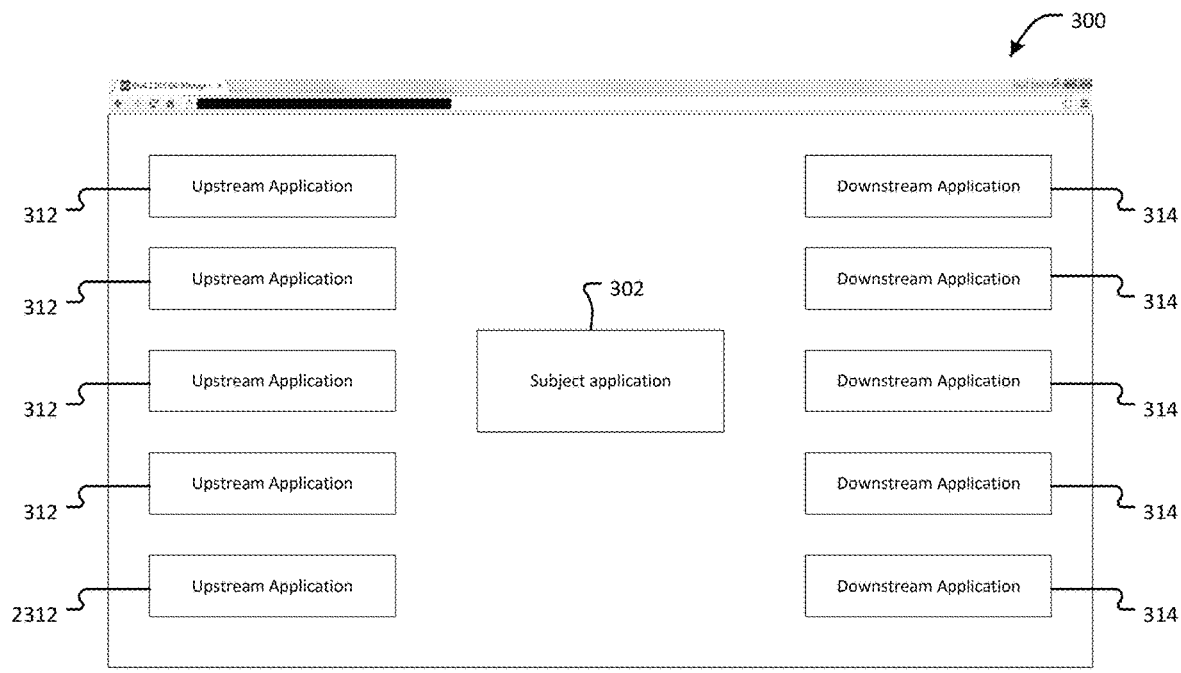
FIG. 25 shows another example of the interface screen including a subject application icon, upstream application icons and downstream applications icons.
Figure 26:
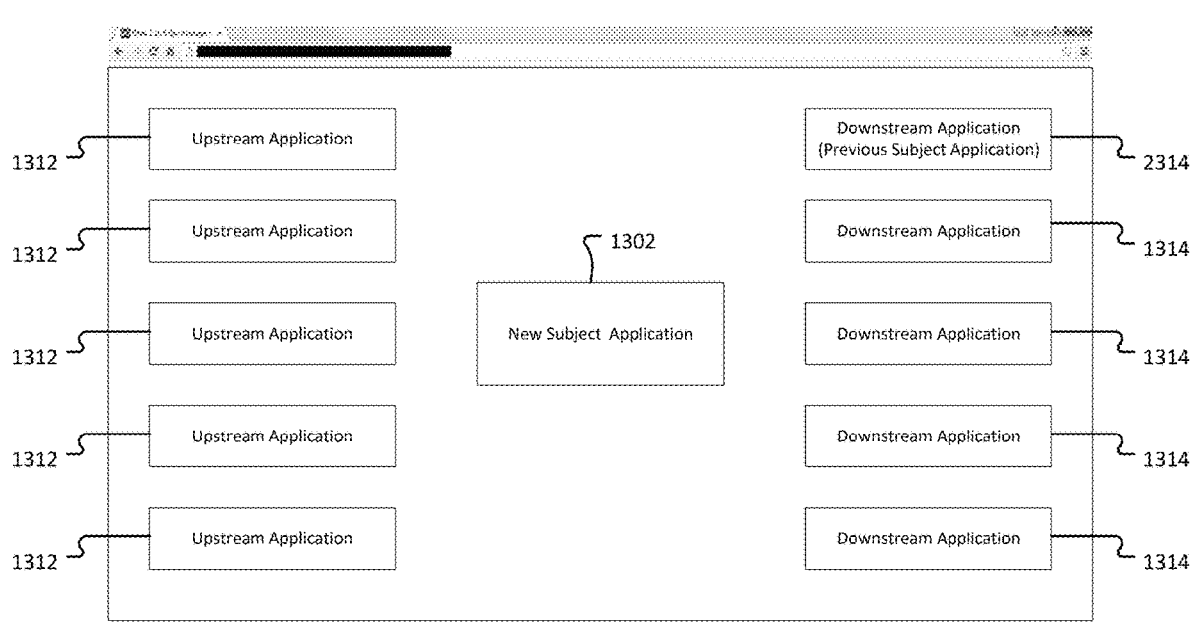
FIG. 26 shows the interface screen after repopulating. The application corresponding to the selected upstream application icon becomes a new subject application, indicated by icon.

In some examples, the data flow tool 70 may be programmed to reconfigure the interface screen 300 to make another application (e.g., an upstream or downstream application) a new subject application (e.g., the new focal application at the center of the interface). FIG. 24 is a flow chart showing one example of a process flow 400 for modifying the user interface screen 300 to show a new subject application. At 402, the data flow tool may display the user interface screen 300 comprising an icon for the subject application a corresponding icon for at least one upstream application and/or at least one downstream application, for example, as illustrated in various figures showing the interface screen. FIG. 25 shows another example of the interface screen 300 including a subject application icon 302, upstream application icons 312 and downstream applications icons 314. Referring back to FIG. 24, the data flow tool 70 may receive a selection from the user of an upstream or downstream application icon 312, 314 to become the new subject application. For example, the user may select the upstream application icon 2312. At 406, the data flow tool 70 may repopulate the interface screen 300 to make the selected upstream or downstream application as the new subject application. For example, FIG. 26 shows the interface screen 300 after repopulating. The application corresponding to the selected upstream application icon 2312 becomes a new subject application, indicated by icon 1302. New upstream applications are indicated by icons 1312. New downstream applications are indicated by icons 1314 and 2314, where icon 2314 corresponds to the prior subject application.

Figure 27:
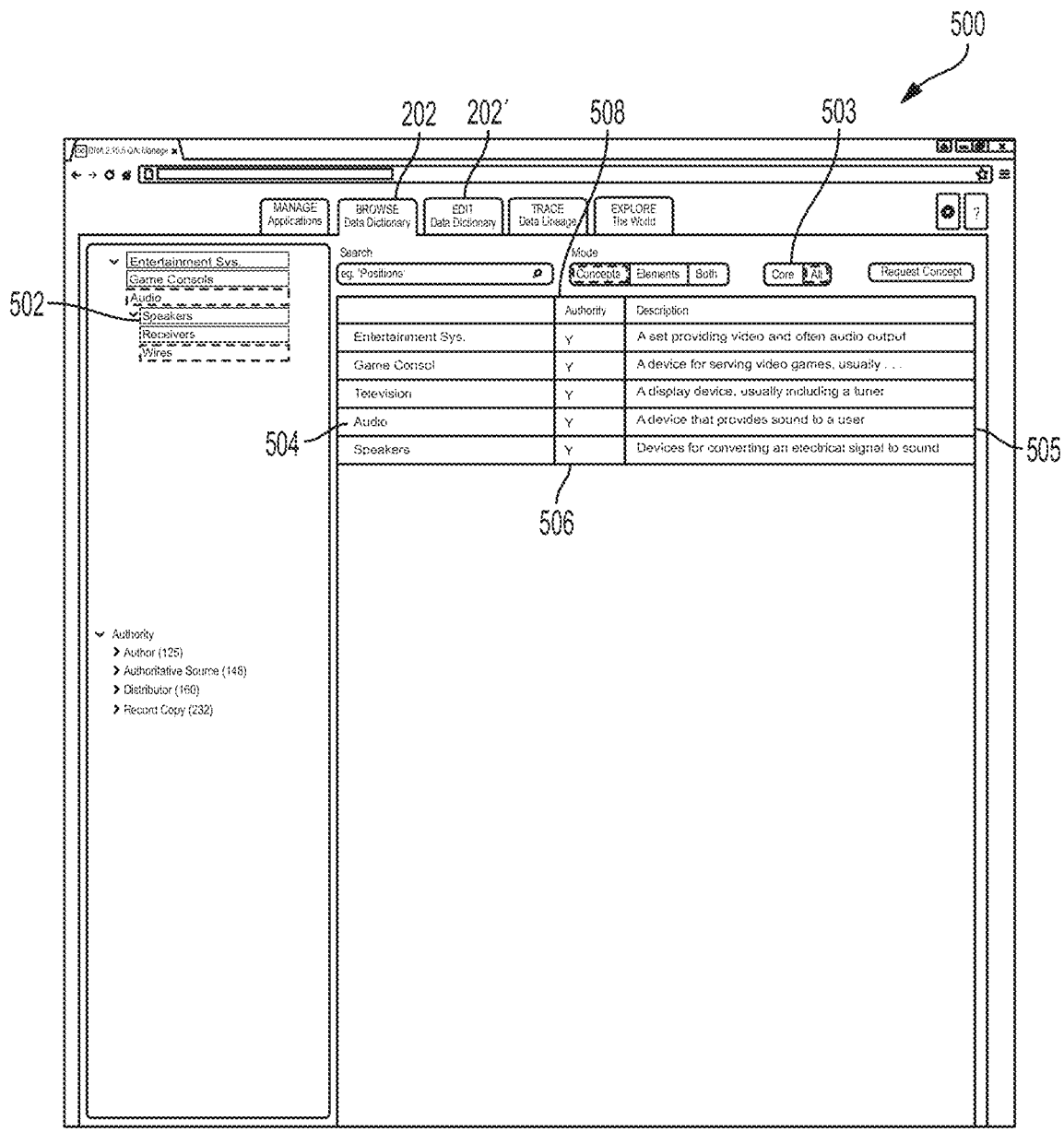
FIGS. 27-29 are screen shots showing one example of an interface screen that may be selected from the browse/edit data dictionary module of the data flow user interface 120.
Figure 28:
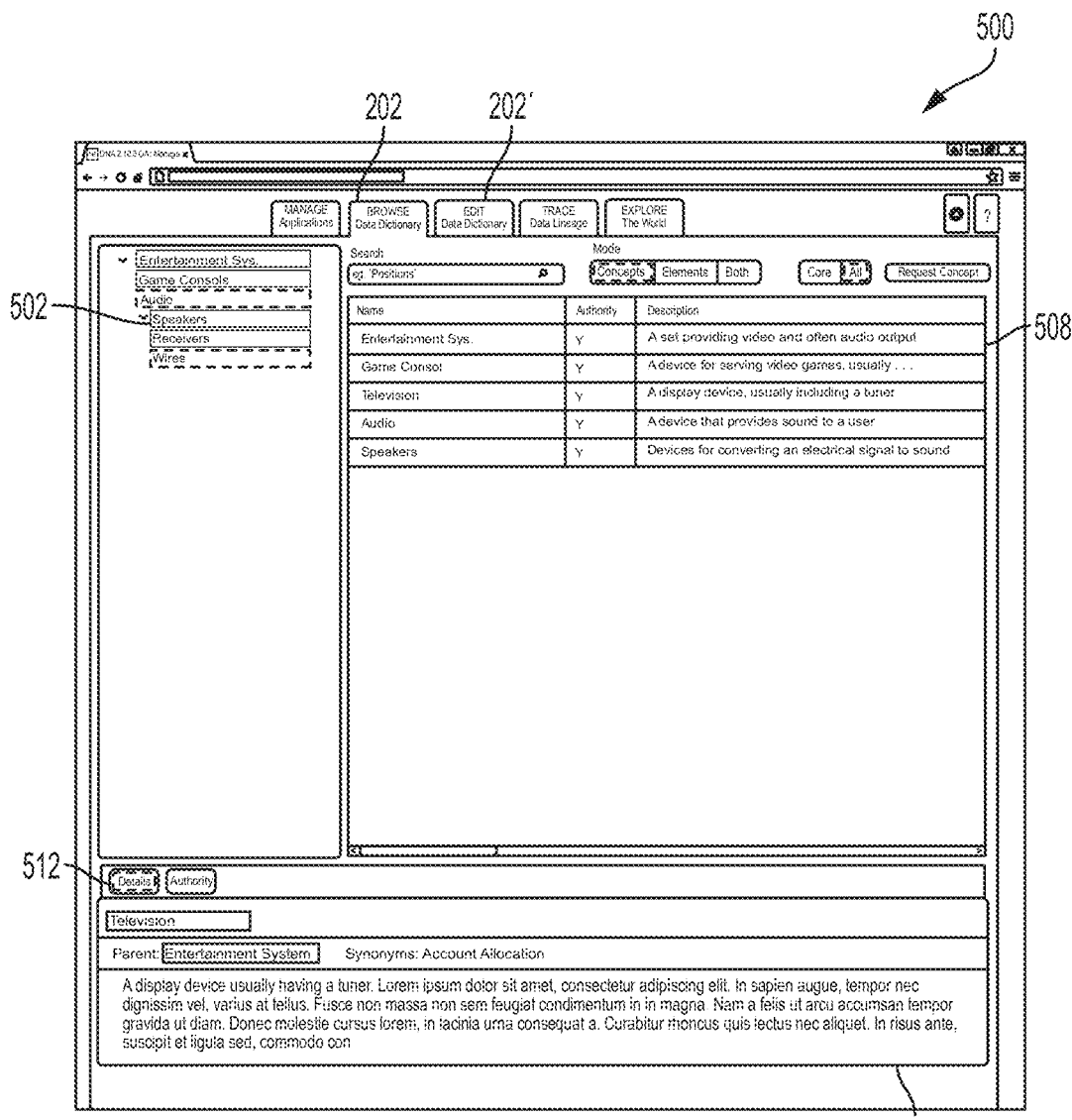
Figure 29:
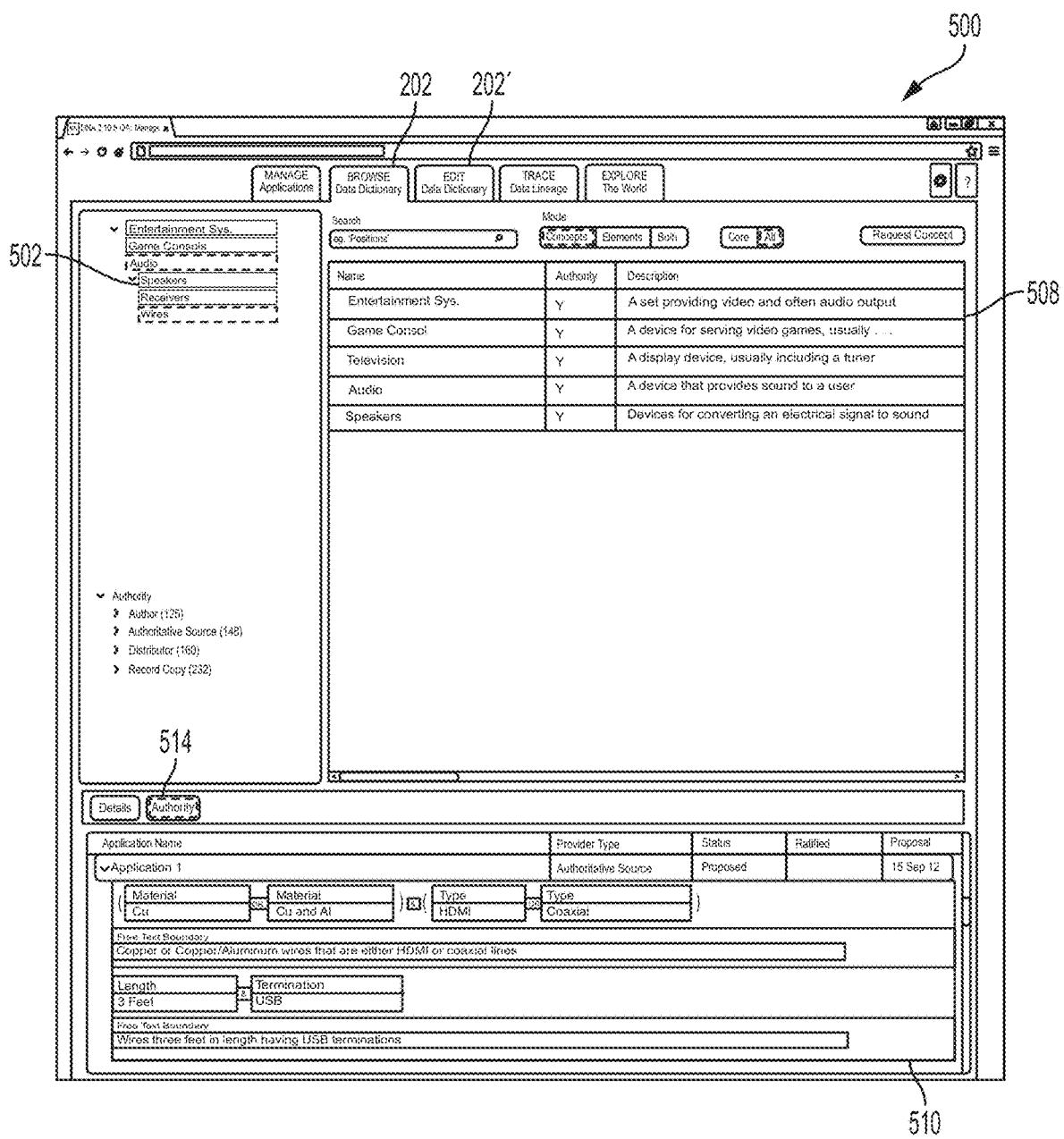

FIGS. 27-29 are screen shots showing one example of an interface screen 500 that may be selected from the browse/edit data dictionary module 124 of the data flow user interface 120. Referring to FIG. 27, the screen 500 may be displayed, for example, by selecting the tab 202 described herein. The screen 500 may comprise a hierarchal subject area field 502 showing hierarchal subject areas for data concept type definitions. In the example of FIG. 27, a subject area Audio and a sub-area Wires are selected. A definition field 503 comprises a hierarchal name column 504 showing names of data concept types and/or categories thereof. An authority column 508 may indicate whether there exists an authoritative source or sources for the indicated data flow (e.g., a validated source of the data flow). A description column 505 may include all or a portion of a description or definition of each data concept type. FIG. 28 shows the screen 500 with an additional Details/Authority field 510. The field 510 may comprise a Details tab 512 that, when selected, may cause the Details/Authority field 510 to include a more detailed description or definition of a selected data concept type. FIG. 29 shows the screen 500 with an Authority tab 514 of the Details/Authority field 510 selected. This may cause the Details/Authority field 510 to include indications of applications that are authorized to provide the data concept type (e.g., for different boundaries). In some examples, the user may modify data concept type, boundary data and/or authority data in the screen 500, for example, by selecting the Edit Data Dictionary tab 202'. To modify data concept type, boundary data and/or authority data, the user may select the appropriate field from the interface screen 500 and enter the desired modification.

Figure 30:
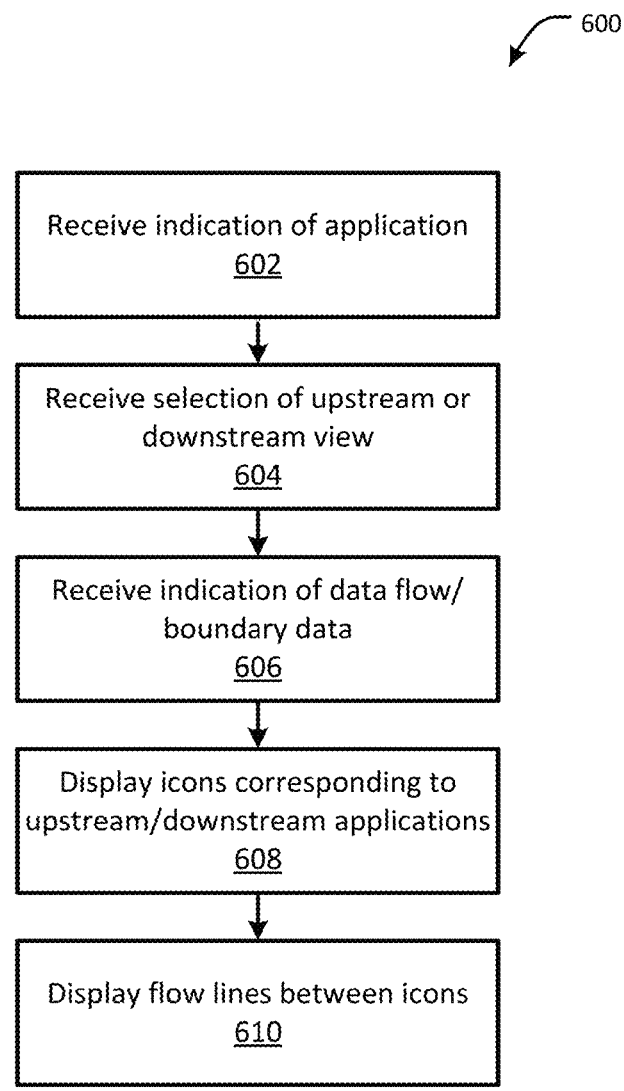
FIG. 30 is a flow chart showing one example of a process flow for displaying the trace data lineage module of the data flow user interface.

FIG. 30 is a flow chart showing one example of a process flow 600 for the trace data lineage module 126. The process flow may be executed by the data flow tool 70 (e.g., the visualization tool 80 thereof). At step 602, the data flow tool 70 may receive an indication of an application (e.g., a subject application whose downstream and/or upstream data flows are to be traced). At step 604, the data flow tool 70 may receive an indication of whether upstream or downstream data flows are to be traced. At step 606, the data flow tool 70 may receive an indication of a data flow to be traced including, for example, a data concept type and boundary data. At step 608, the data flow tool 70 may display a user interface screen comprising an icon indicating the upstream and/or downstream applications providing data flows to and/or receiving data flows form the subject application. At step 610, the data flow tool may display flow lines between the icons. The flow lines may indicate data flows between the corresponding applications.

Figure 31:
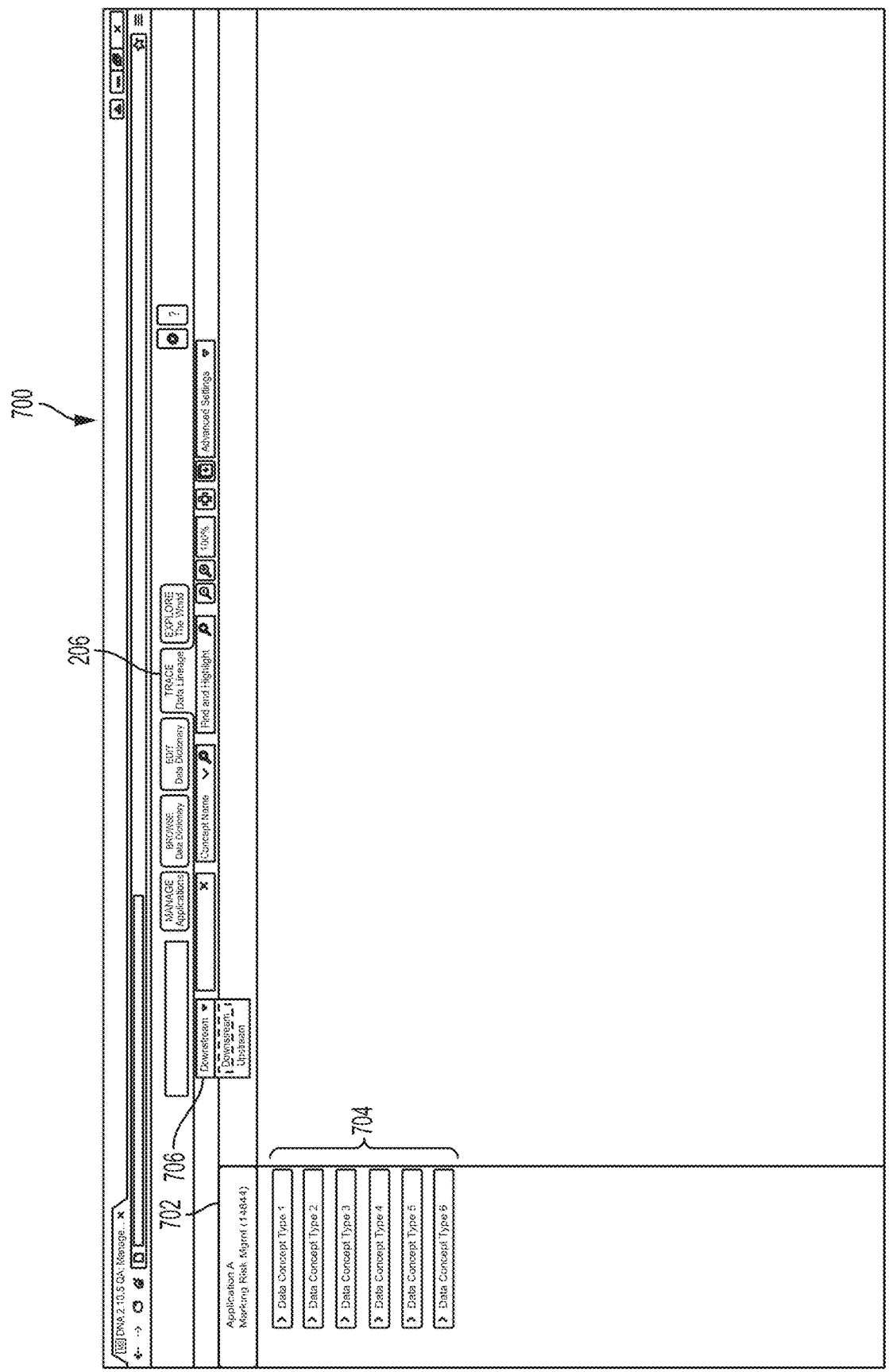
FIGS. 31-36 are screen shots showing examples of an interface screen that may display data flow tracing, for example, as described with respect to FIG. 30.
Figure 32:
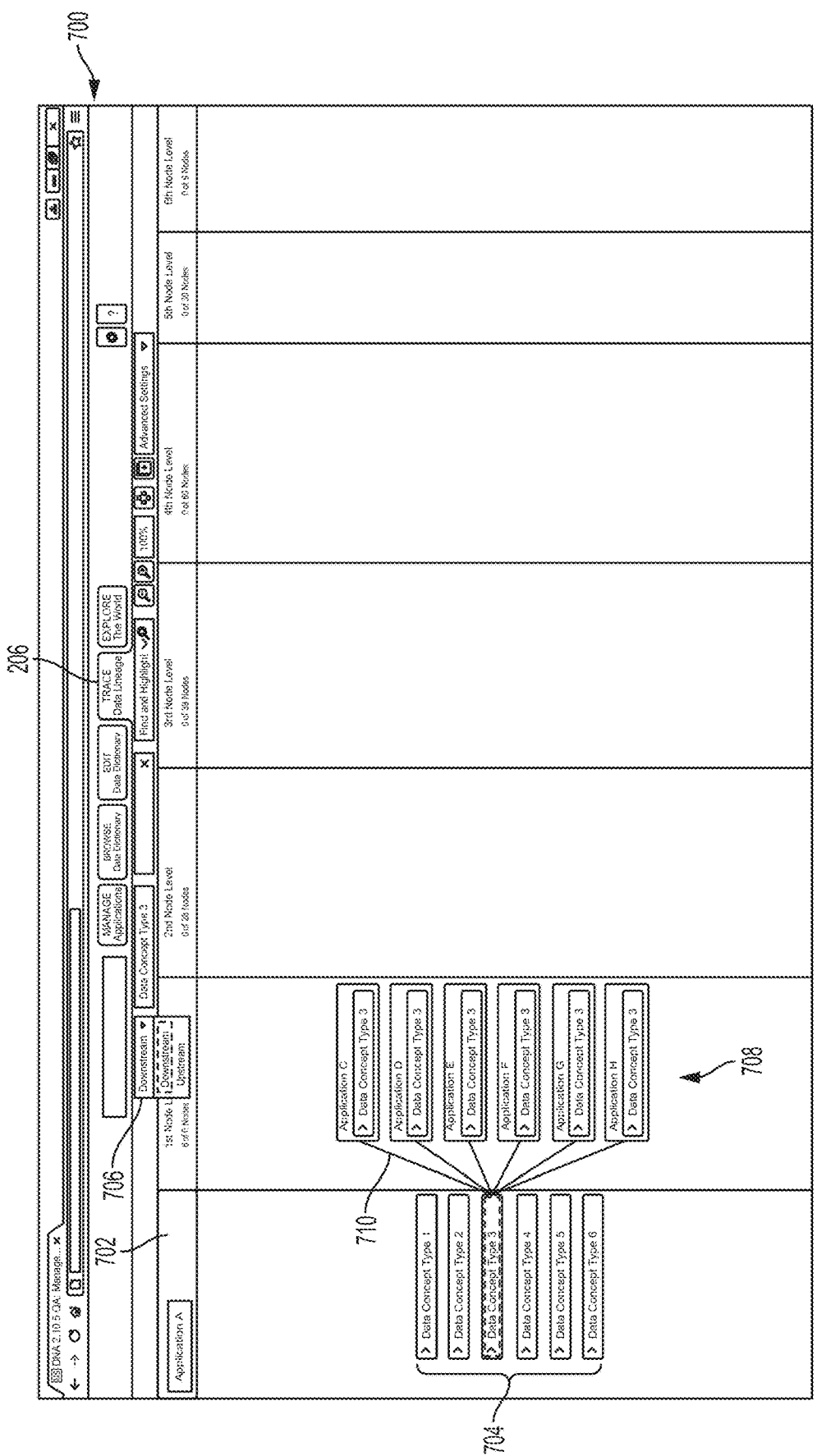
Figure 33:
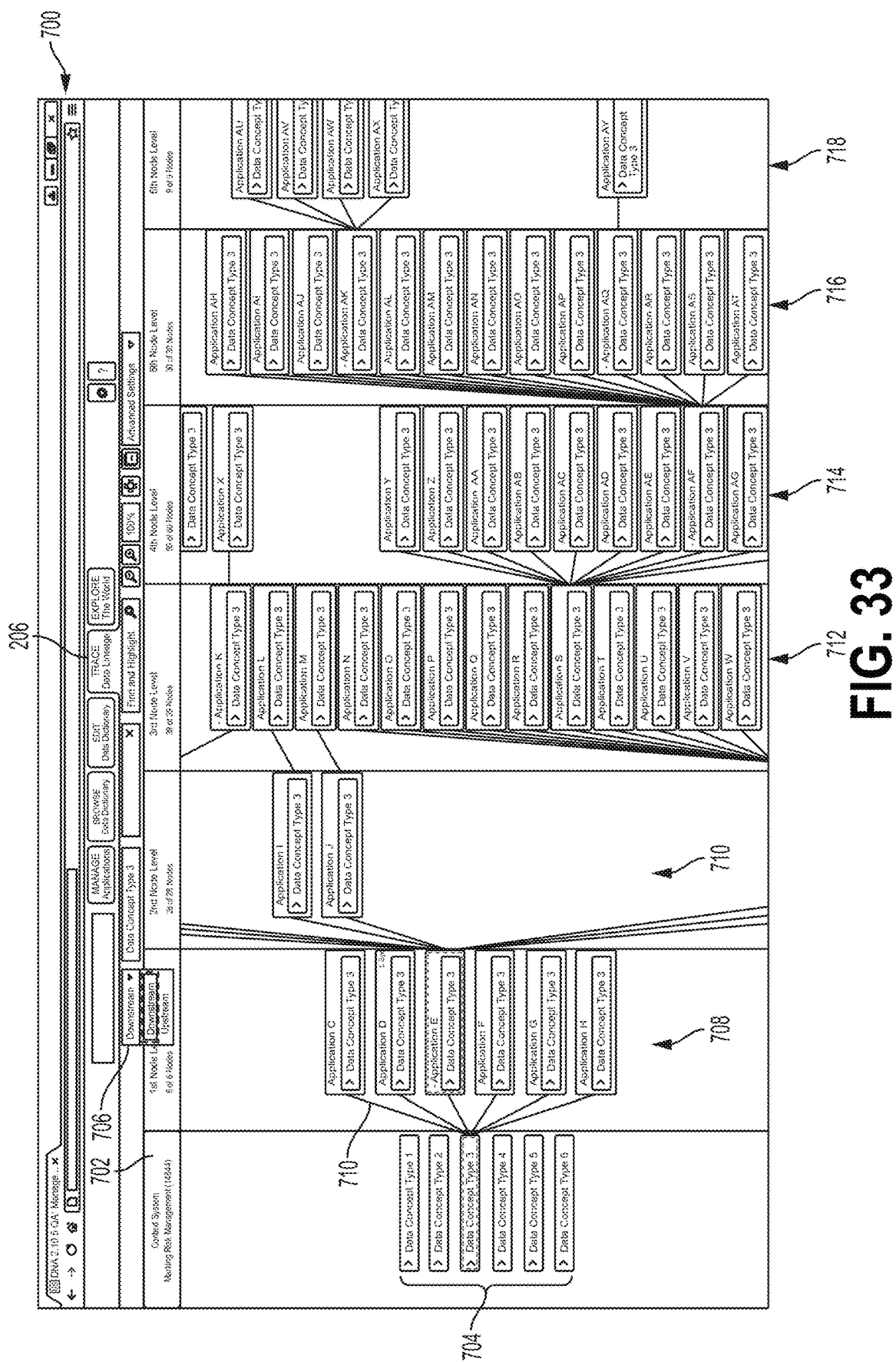
Figure 34:
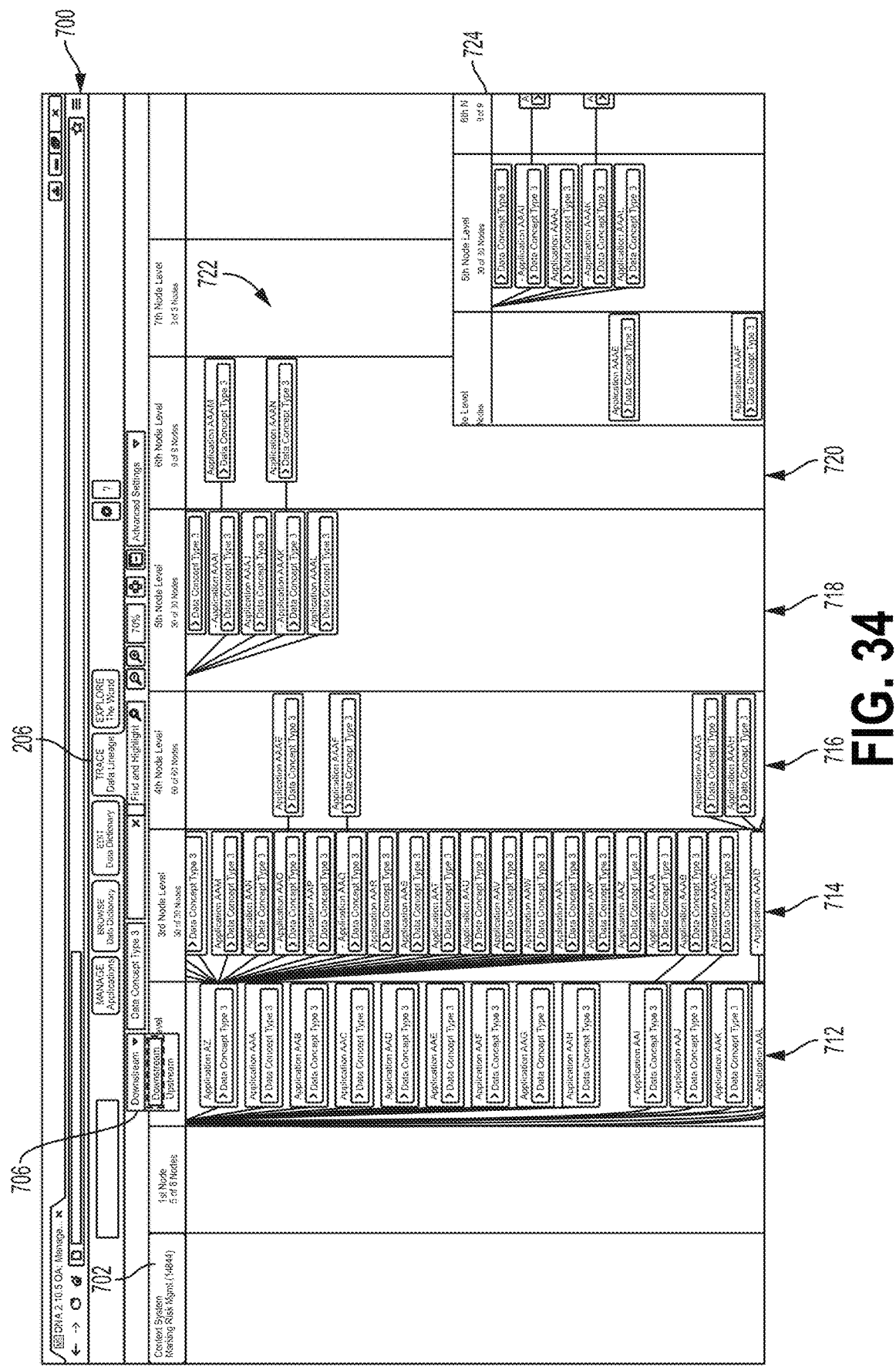

FIGS. 31-36 are screen shots showing examples of an interface screen 700 that may display data flow tracing, for example, as described with respect to FIG. 30. In FIGS. 31-36, data flows are labeled as "data concept types." A single data flow may comprise data of a single data concept type and/or may comprise multiple data concept types. In some examples, the screen 700 may be displayed when the tab 206 is selected. Referring to FIG. 31, a Context System column 702 displays data flows 704 generated and/or passed through by a subject application. A Downstream/Upstream field 706 may receive an indication of whether the screen 700 will show downstream or upstream data flows (e.g., see 604 above). FIG. 32 shows a hierarchy of application nodes. In FIG. 32, the user has selected a data flow called "data concept type 3" from the Context System column 702 (e.g., see 606 above). The data flow tool 70 may populate the first application node level column 708 to include application icons, with each application icon corresponding to an application downstream from the subject application. Flow lines 710 may indicate direct data flows between applications (e.g., the data generated by the subject application is provided directly the downstream application). In some examples, the user may select one or more applications from the first application node level from the first column 708 to view other downstream data flows between applications. For example, in FIG. 33, the user has selected Concept 3 from an application called Application E at the first application node level column 708. This may cause the data flow system 70 to plot additional applications at different node levels that receive the Concept 3 data flow from Application E, for example, at a second application node level 710, a third application node level 712, a fourth application node level 714, a fifth application node level 716, and/or a sixth application node level 718. In FIG. 34, an emphasis window 724 is displayed. In some examples, the user may modify a portion of the screen 700 shown in the emphasis window 724, for example, by clicking and dragging on the window 724. FIG. 34 also shows applications at a sixth application node level 720 and a seventh application node level 722.

Figure 35:
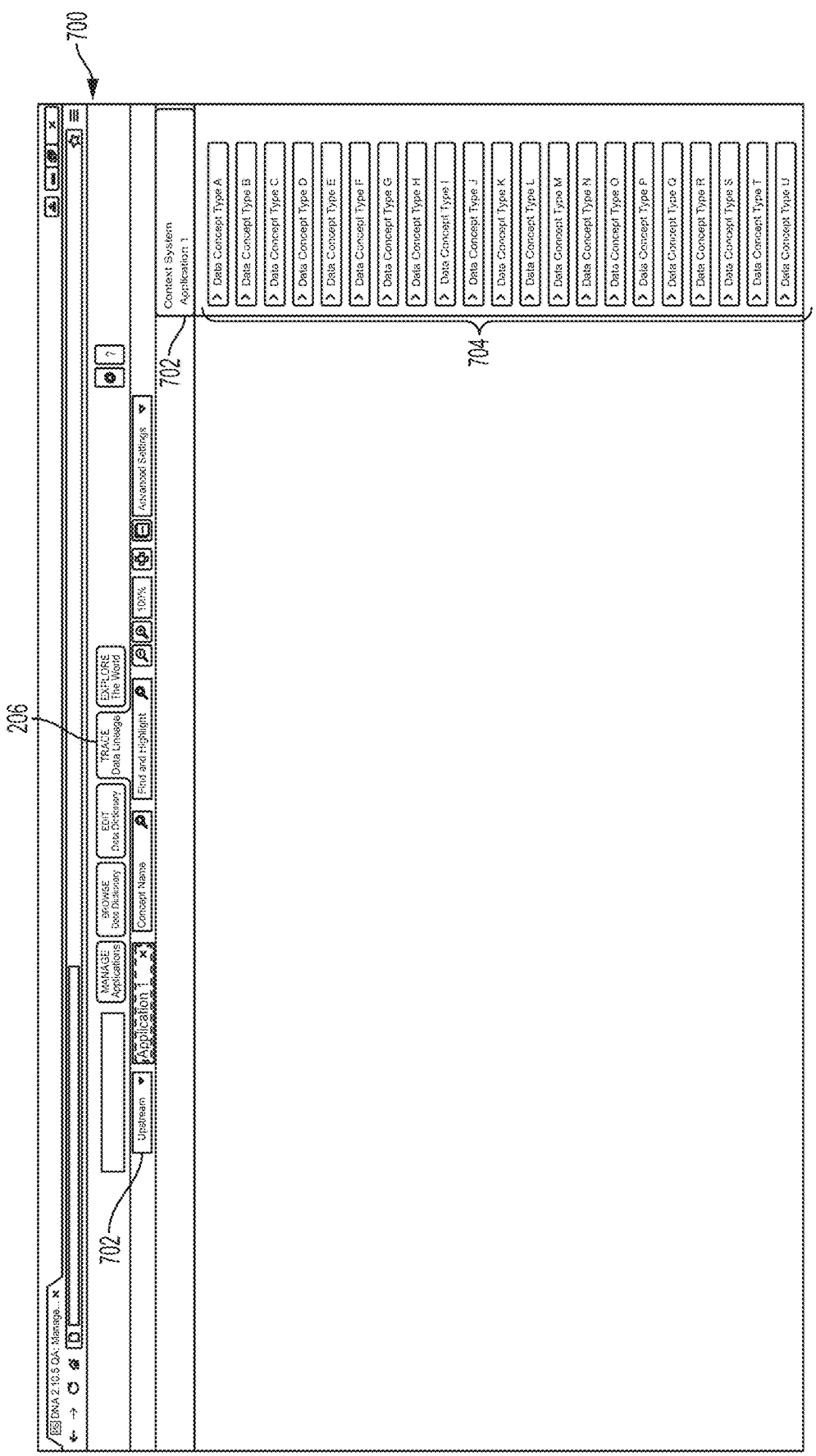
Figure 36:
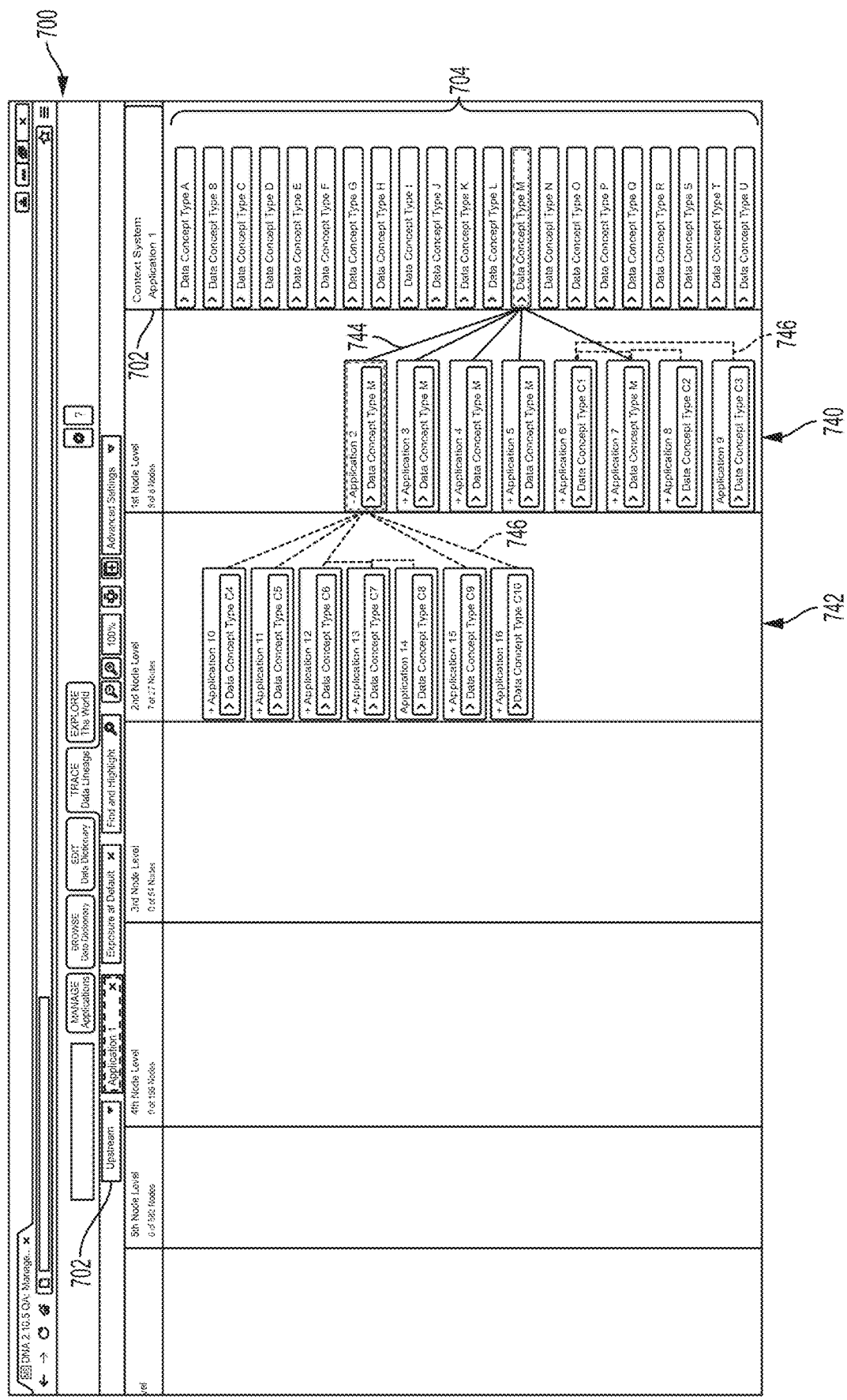

FIGS. 35 and 36 show the interface screen 700 configured at field 702 to show upstream data flows (e.g., data flows received by the subject application indicated at column 702). In FIG. 36, the user has selected a data flow 704 from the Context System column 702, causing upstream applications to be displayed at the first application node level column 740 and the second application node level column 742. Flow lines 744 may indicate instances where an application provides a data flow directly to the subject application. Animated flow lines 746 may indicate contributory data flows (e.g., data flows that contribute to the selected upstream data flow for the subject application). Animated flow lines 746 may originate from applications/data flows different from the selected data flow that are used by one or more applications to generate the selected data flow. Animated flow lines 746 may comprise dashes that move down the lines in the direction of the data flow. Animated flow lines 746 may be animated in a manner that graphically indicates the direction of the data flow. For example, stripes may progress along animated flow lines 756 in the direction of data flow. In the example of FIG. 36, contributory Concept C4 is provided to Application 2, which uses Concept C4 to develop Concept M, which is provided to Application 1. Other contributory data concept types shown in FIG. 36 may be processed in a similar manner.

Figure 37:
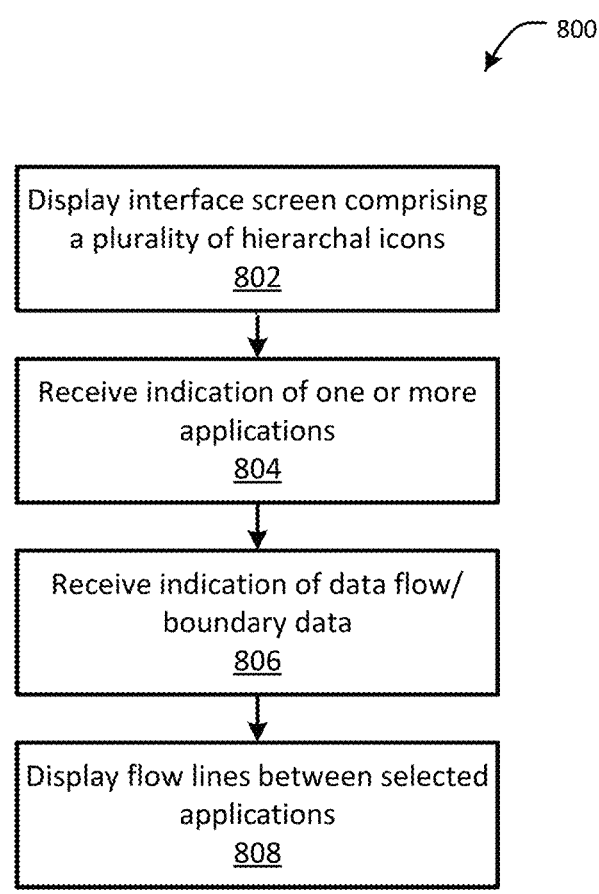
FIG. 37 is a flow chart showing one example of a process flow that may be executed by the data flow tool of FIG. 3 to generate the explore data flows module of the data flow user interface.
Figure 38:
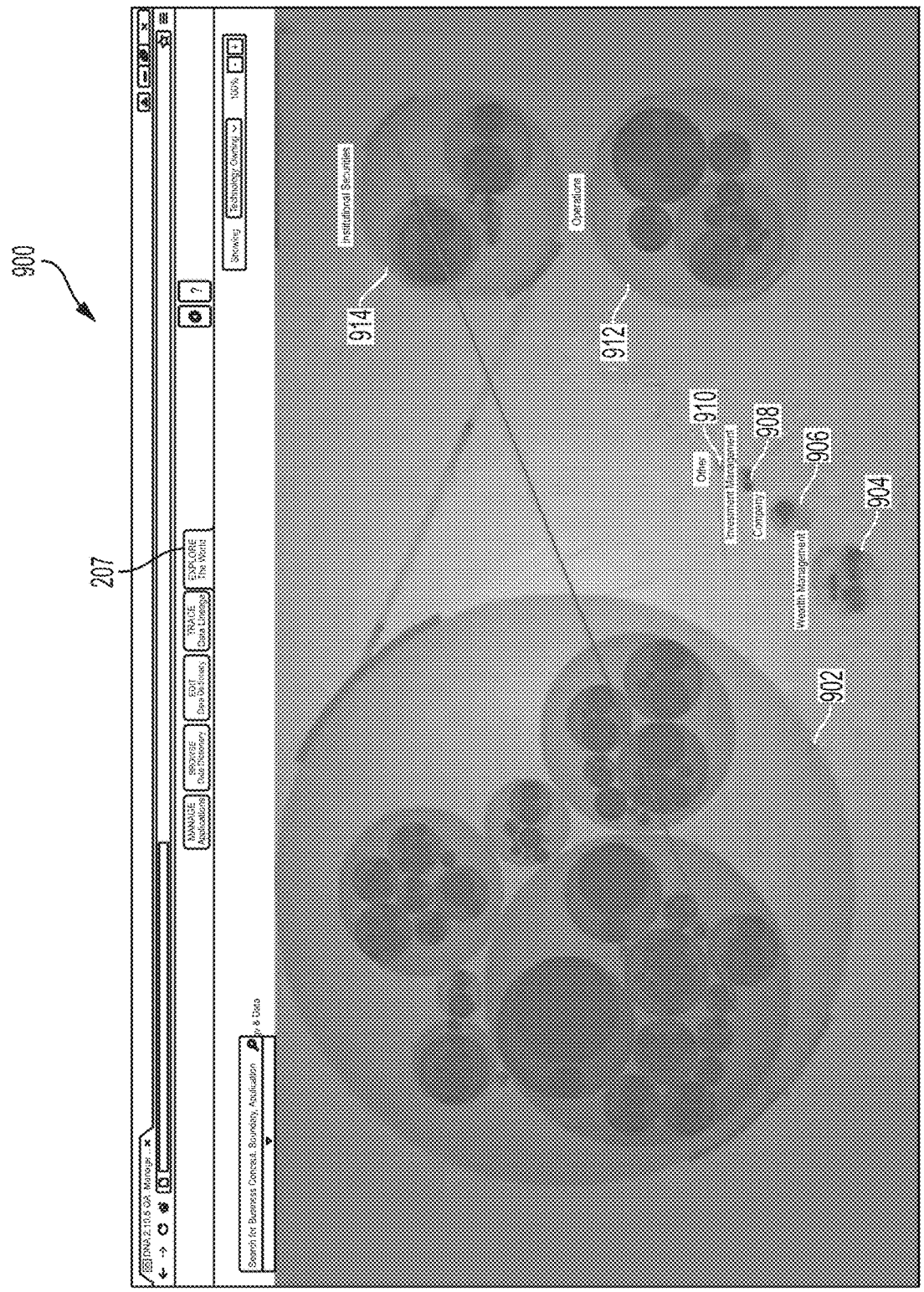
FIGS. 38-41 are screen shots showing examples of an interface screen implementing the explore data flows module.

FIG. 37 is a flow chart showing one example of a process flow 800 that may be executed by the data flow tool 70 (e.g., the visualization tool 80) to generate the explore data flows module 128 of the data flow user interface 120. FIGS. 38-41 are screen shots showing examples of an interface screen 900 implementing the explore data flows module 182. At step 802, the data flow tool 70 may display an interface screen comprising a plurality of hierarchaly-arranged icons, where each icon corresponds to a system node of the distributed computing system. For example, FIGS. 38-41 may show a distributed computing system implemented by a financial services firm. FIG. 38 shows the interface screen 900 comprising icons indicating a Security and Data system node 902, a Wealth Management system node 904, a Company system node 906, an Investment Management system node 908, an Other system node 910, an Operations system node 912, and an Institutional Securities system node 914. Each system node may be associated with one or more applications. In some examples, the screen 900 may be displayed by selecting the tab 207.

Figure 39:
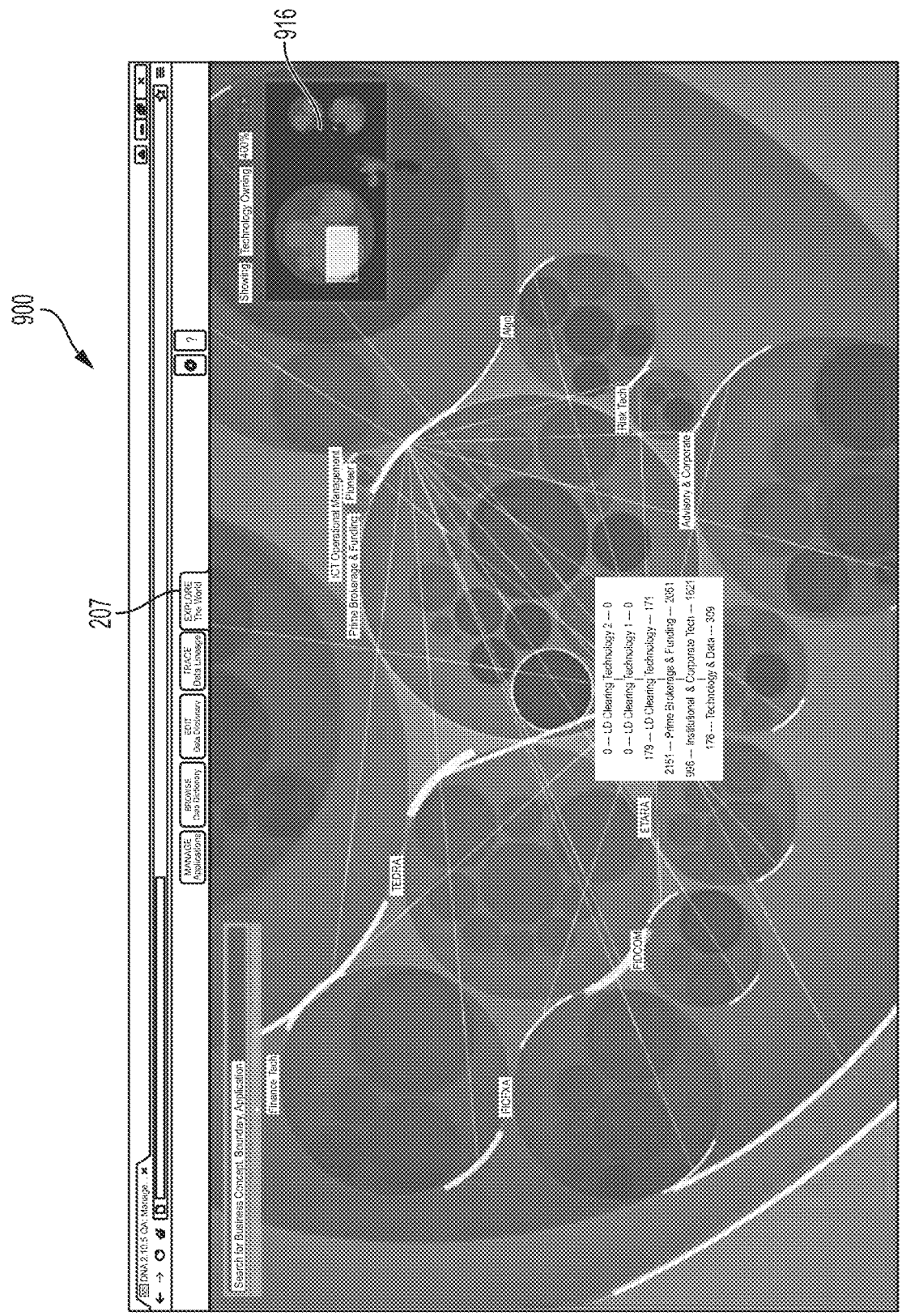
Figure 40:
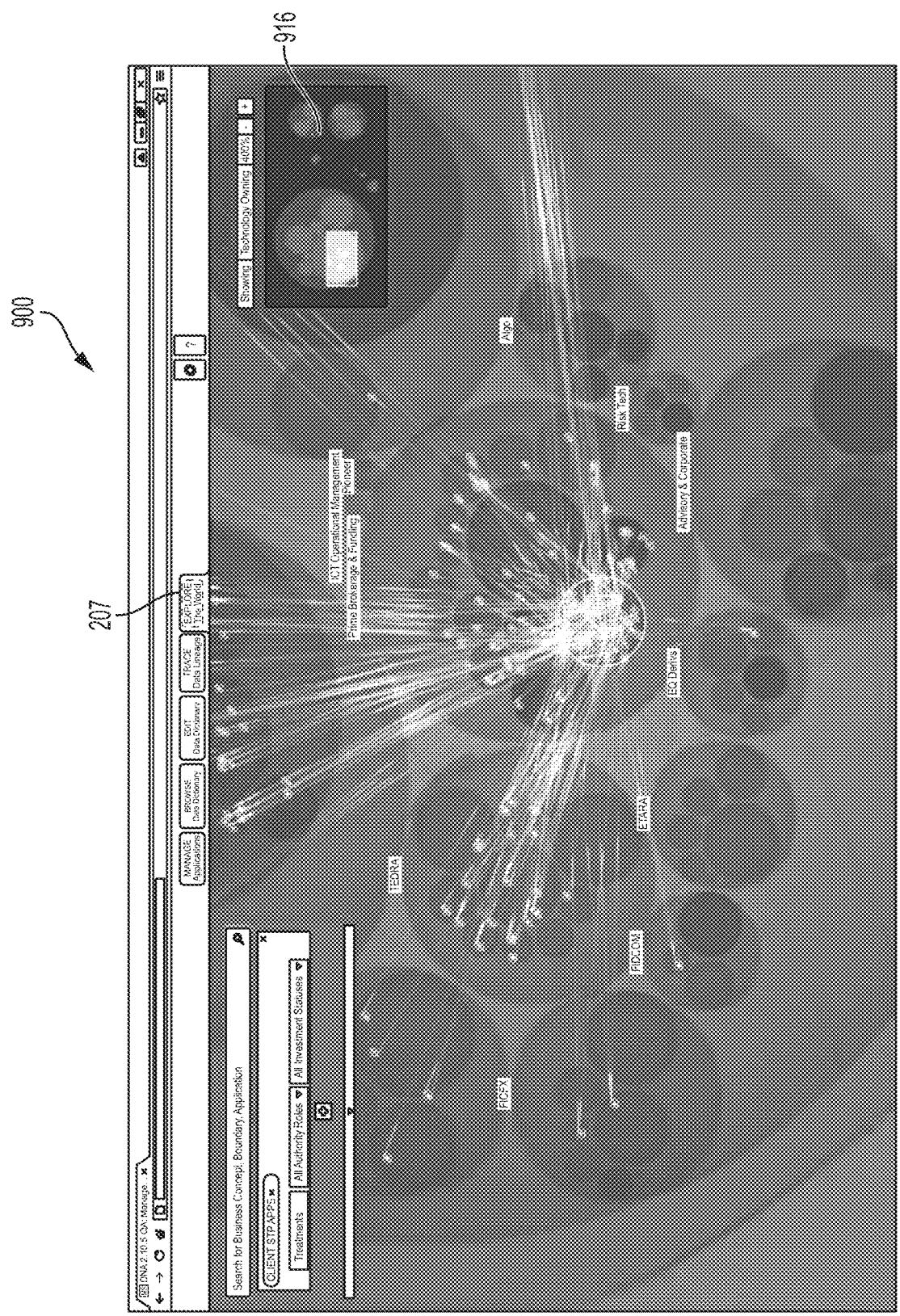
Figure 41:
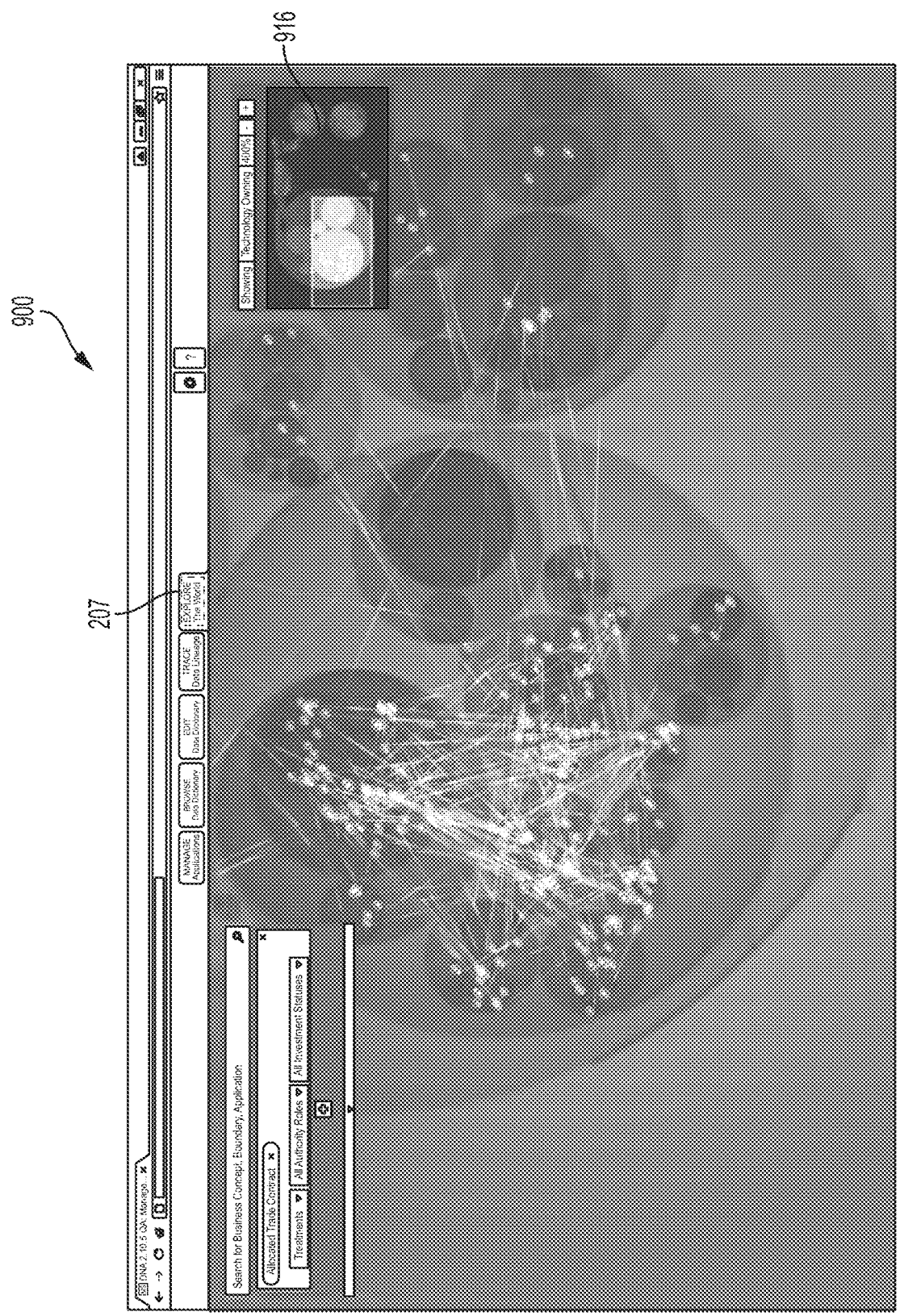

At step 804, the data flow tool 70 may receive an indication of one or more system nodes and/or applications from the user. At step 806, the data flow tool 70 may receive an indication of a data concept type and/or boundaries from the user. At step 808, the data flow tool 70 may display flow lines between the selected system nodes and/or applications, where the flow lines indicate data flows between the system nodes and/or applications. FIG. 39 shows the interface 900 configured to display flow lines between a selected set of network nodes for a selected set of data flows. A navigation window 916 shows a position of the screen 900 relative to the full, zoomed-out screen shown in FIG. 38. FIG. 40 shows the interface 900 configured to display flow lines between a selected set of applications 916 for a selected set of data flows. FIG. 41 shows the interface 900 configured to display flow lines between a second selected set of applications for a second selected set of data flows.

Figure 42:
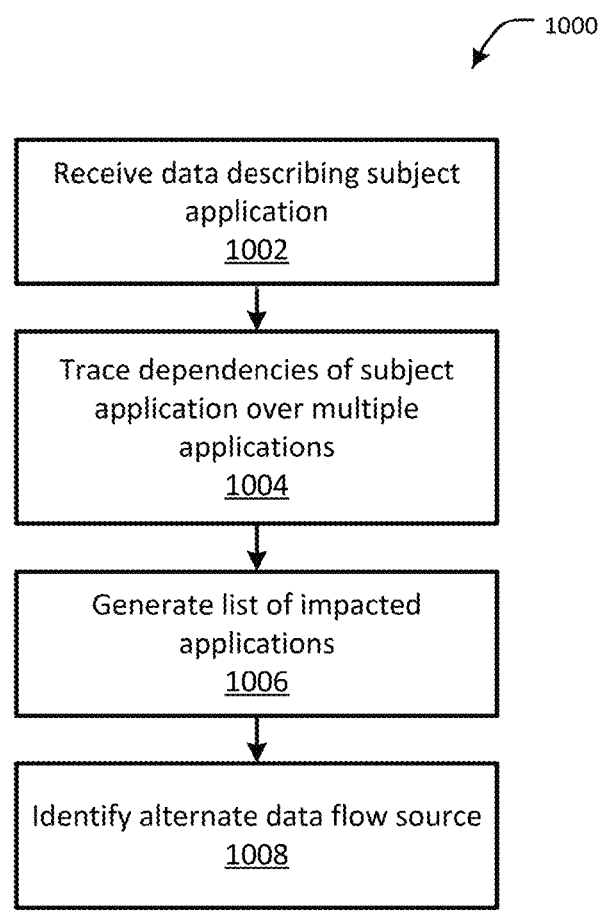
FIG. 42 is a flow chart showing one example of a process flow that may be executed by the data flow tool to determine applications impacted by a subject application.

FIG. 42 is a flow chart showing one example of a process flow 1000 that may be executed by the data flow tool 70 to determine applications impacted by a data error in or by the subject application. At step 1002, the data flow tool 70 may receive data describing a subject application (e.g., an application whose impact is being traced from the user). At step 1004, the data flow tool 70 may trace dependencies of the subject application. For example, the data flow tool 70 may identify first node level applications that receive data flows from the subject application. Second node level applications that receive data flows from the first node level applications may be identified. Subsequent node level applications may be identified in a similar manner. At step 1006, the data flow tool 70 may generate a list of applications impacted by the subject application, where the list includes applications at the first and subsequent application node levels. The listed application may be impacted by a data error by (including a failure of) the subject application. Optionally, at step 1008, the data flow tool 70 may identify an alternate data flow source (e.g., application) for one or more of the data flows of the subject application. The alternate data flow source may be another application providing the same data flow (e.g., with the same or broader boundaries). The alternate data source may be provided to the impacted applications.

Figure 43:
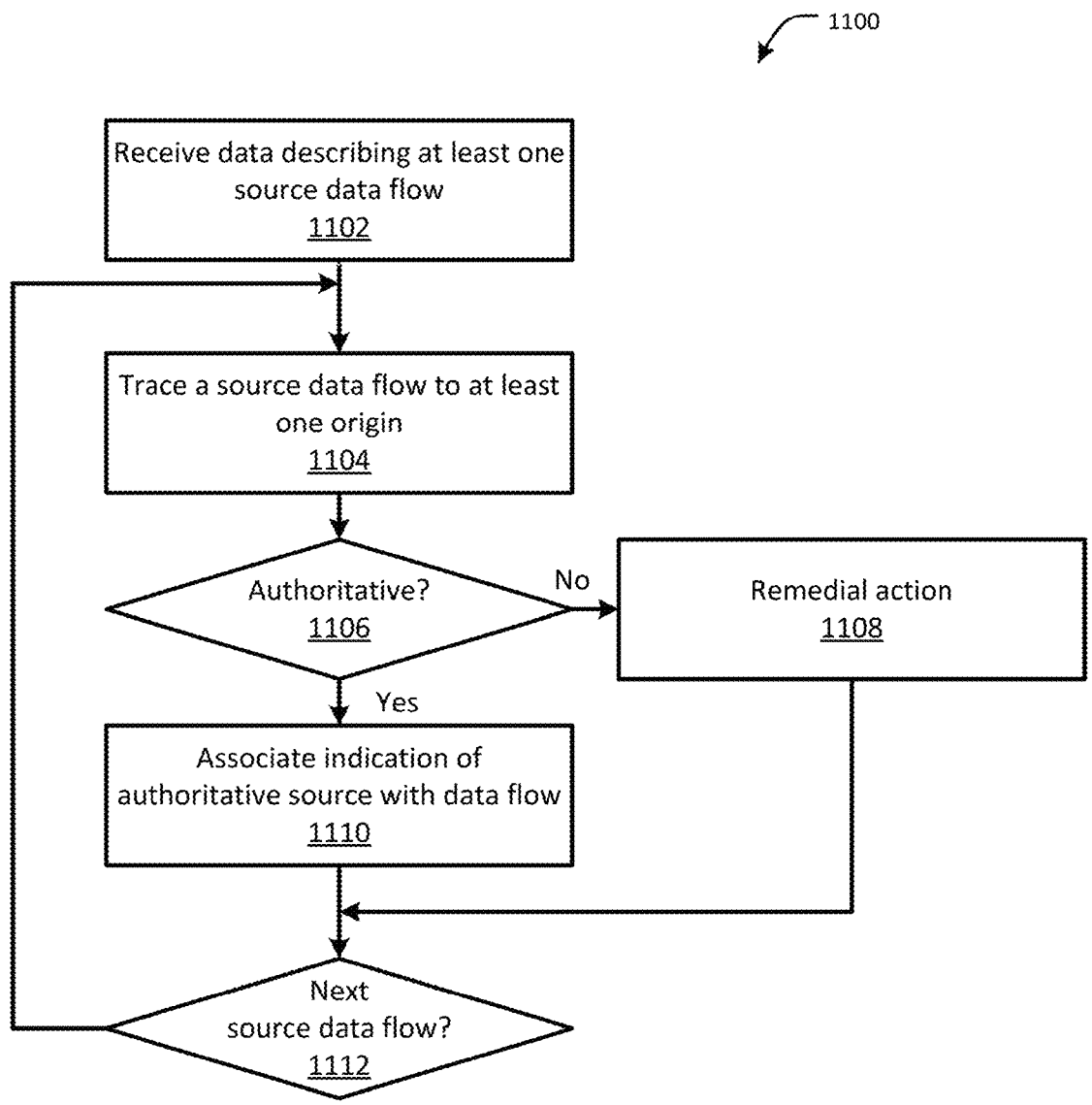
FIG. 43 is a flow chart showing one example of a process flow that may be executed by the data flow tool to identify and remediate data flows originating from non-authoritative sources.

FIG. 43 is a flow chart showing one example of a process flow 1100 that may be executed by the data flow tool 70 to identify and remediate data flows originating from non-authoritative sources. At step 1102, the data flow tool 70 may receive data describing at least one source data flow. For example, the data may be received from a user and may identify a data flow to be verified. At step 1104, the data flow tool 70 may trace the data flow to at least one origin application. At step 1106, the data flow tool 70 may determine whether the source application is an authoritative source for the data flow. If so, the data flow tool 70 may, at step 1110 associate an indication of the authoritative source with the data flow at the various applications that utilize the data flow. If the origin application is not authoritative, the data flow tool 70 may take remedial action at step 1108. The remedial action may include, for example, providing an indication of the non-authoritative data flow to a system administrator, automatically identifying an authoritative data flow and replacing the non-authoritative data flow, etc. If additional data flows are to be analyzed at step 1112, the data flow tool 70 may return to step 1104.

Figure 44:
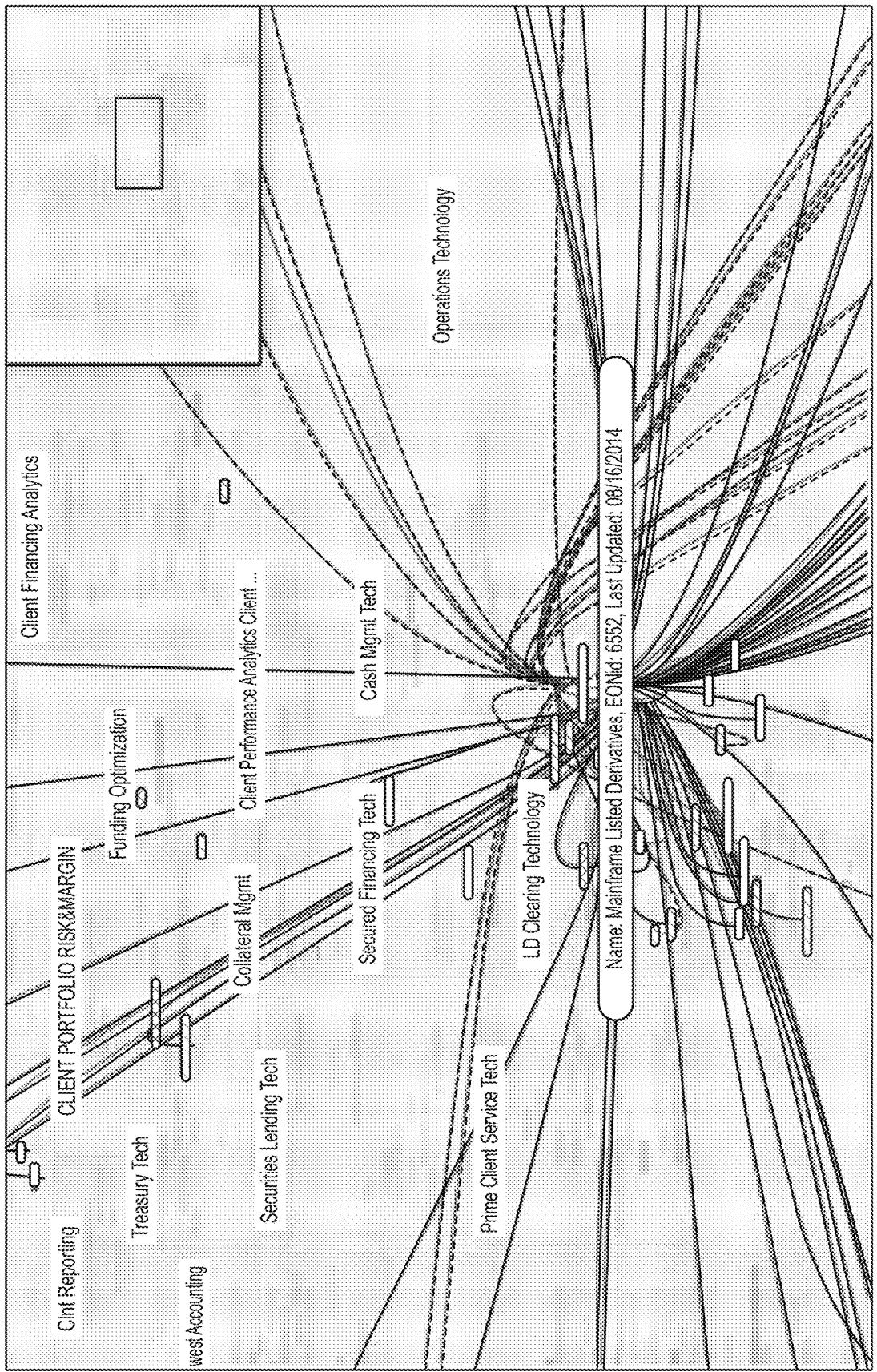
FIG. 44 is a screen shot showing another example of an interface screen that may display data flow tracing, for example, as described with respect to FIG. 30.

FIG. 44 is a screen shot showing another example of an interface screen that may display data flow tracing, for example, as described with respect to FIG. 30. For example, in FIG. 44, network nodes are displayed as boxes with applications in a given system node represented as colored boxes therein. Data streams between applications are illustrated by lines between applications and/or system nodes. A navigation field in the upper right corner of the screen includes a position box showing the portion of the distributed computer system illustrated in the remainder of the interface screen.

Figure 45:
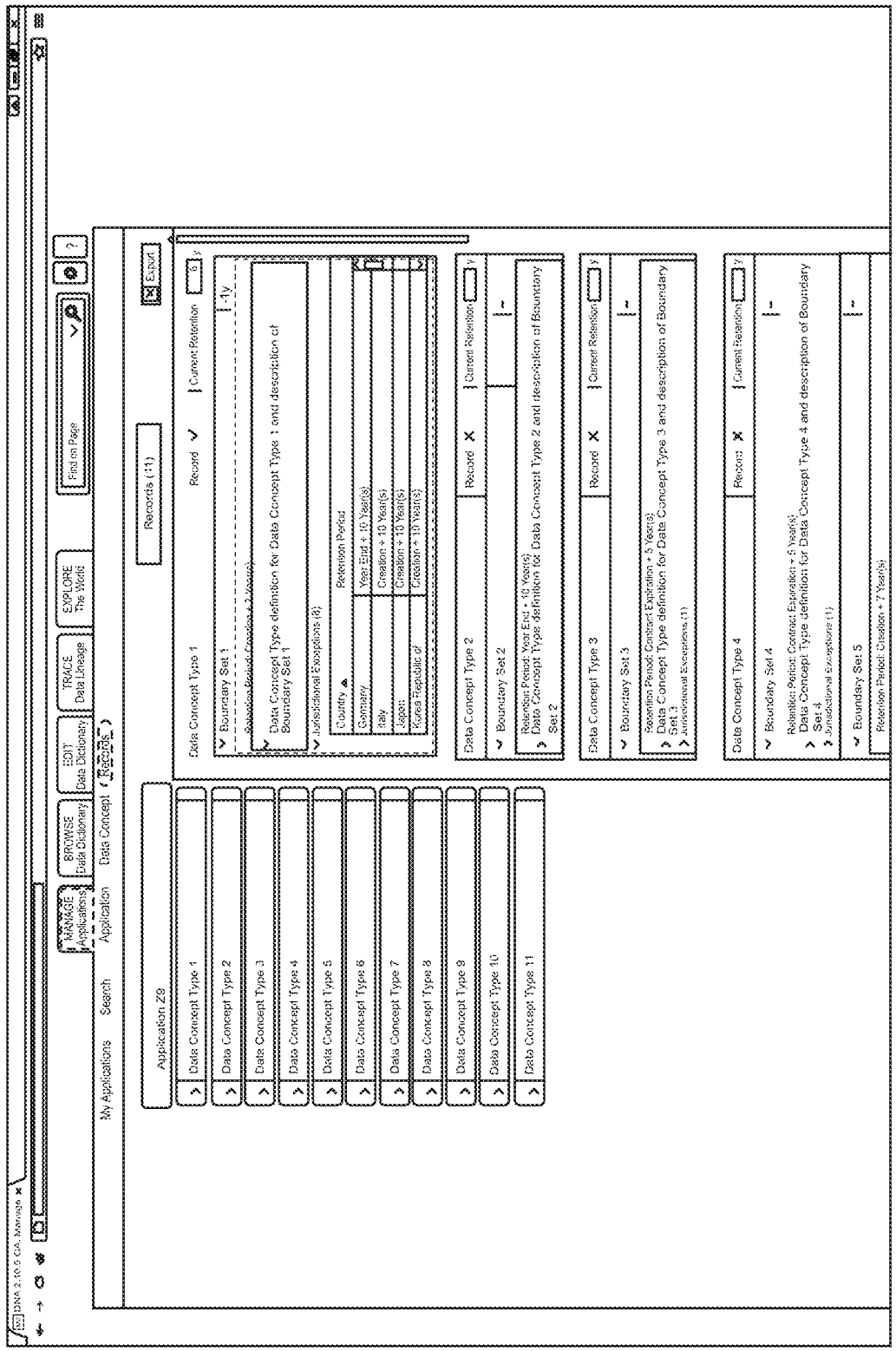
FIGS. 45 and 46 are screen shots showing one example of an interface screen for managing retention properties for data flows.
Figure 46:
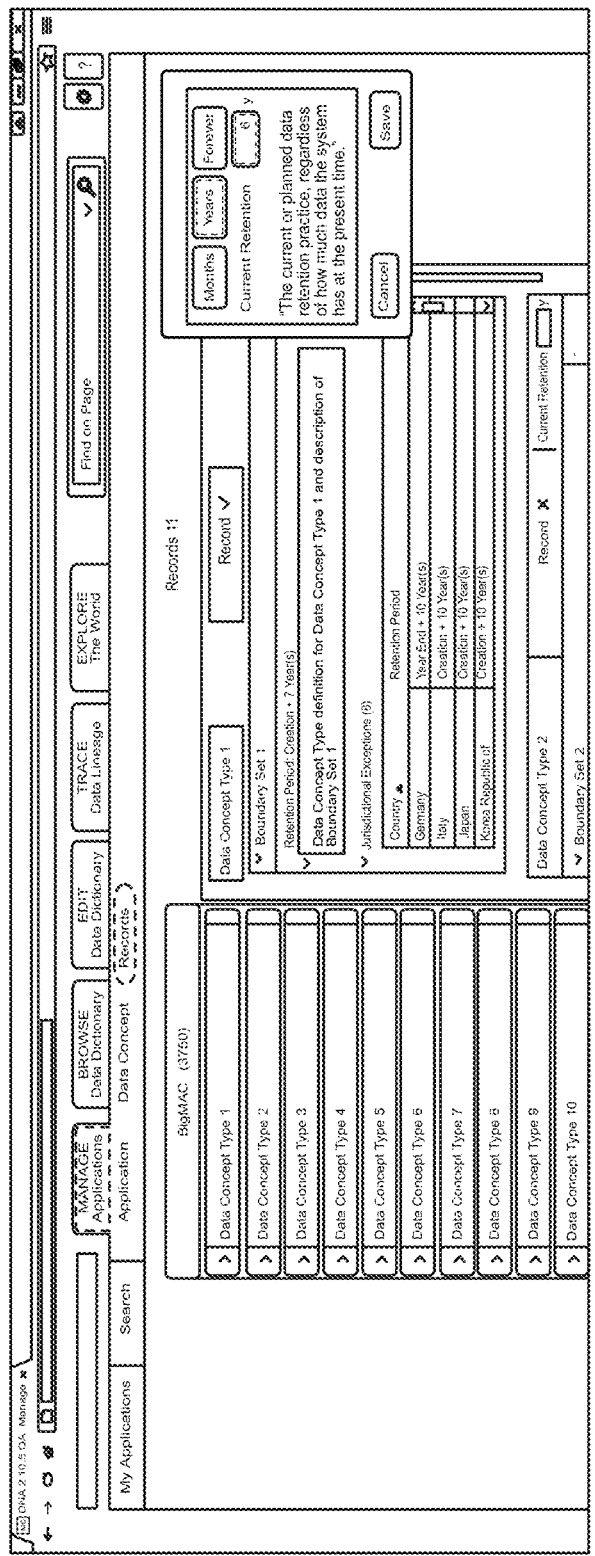

In some examples, the data flow tool 70 may also be configured to manage retention properties for some or all of the data flows in a distributed computing system. For example, FIGS. 45 and 46 are screen shots showing one example of an interface screen for managing retention properties for data flows. In the example of FIG. 45, the interface screen is shown configured to display data flows for an example Application Z9. Records retention policies for each data flow are shown in the right hand side of the screen. For example, each data concept type may have an entry on the right side of the screen showing a boundary set for the data flow and a record retention policy. The distributed computer system (e.g., the Application Z9 thereof) may maintain a record of data received by the respective data flows as indicated on the interface. In some examples, a data flow may have a default retention period as well as Jurisdictional Exceptions denoting jurisdictions having longer or shorter retention periods. FIG. 46 shows a retention modification field where an authorized user may modified the retention period for an application and/or the distributed computing system as a whole. The user may set the retention period to any suitable value including, for example, a number of months, a number of years, forever, etc.

In one general aspect, therefore, the present invention is directed to a distributed computing environment 10 that comprises a plurality of distributed computer systems 52 interconnected by one or more data networks 56, 58. The plurality of distributed computer systems executes a plurality of applications 2. At least one of the distributed computer systems executes a data flow software tool 70 that identifies potential data flows between the plurality of applications and generates a GUI that shows at least one upstream application and/or at least one downstream application for a subject application. The subject application can be selected by a user via the GUI; the at least one upstream application is an application that provides an incoming data flow to subject application; and the at least one downstream application is an application that receives an outgoing data flow from the subject application. In addition, the data flow software tool 70 (when executed by the at least one computer system) receives, via the GUI, from the user, a first input for the at least one upstream application and/or a second input for the at least one downstream application. The first input comprises a verification that the at least one upstream application provides the incoming data flow to the subject application and the second input comprises a verification that the at least one downstream application receives the outgoing data flow from the subject application.

In various implementations, the potential data flows between the plurality of applications are identified based on metadata about data flow transfer mechanisms in the distributed computing system. Also, the software tool may assign at least one of the following to each identified potential data flow: (i) a data concept type that identifies an aspect of a business function associated with the distributed computing environment; (ii) data flow boundary data that defines a subset of a data concept type; and/or (iii) attribute data that comprises parameters associated with data concept type. The distributed computing environment can be for a financial institution, in which case the data concept type may be, for example, a trade contract, a position, a market valuation, a profit and loss (P&L), or a general ledger, and the data flow boundary data can comprise a type of security, a geographic location, or a legal jurisdiction. For example, where the data concept type is a trade contract, the boundary data for a data flow can specify a particular and applicable type of trade contract, such as an interest rate derivative trade contract, an equity derivative trade contract, an fx trade contracts, etc. That way, one broad definition of a data concept type can be used for multiple different types of subcategories or subsets of that concept, which reduces the need to add new data concept type definitions to the dictionary. The attribute data can be parameters that are relevant to the selected concept type and boundaries. For example, for a trade contract, the attribute data could be parameters such as strike prices, strike or expiry dates, an applicable currency designation for the contract, etc.

In addition, the data flow software tool generates a visualization interface for the distributed computing system that tracks data flows in the distributed computing system. The visualization interface may trace the data flows for a data concept type selected by a user via the GUI from an upstream application that uses the selected data concept type to two or more downstream applications that also use data having the selected data concept type. Also, the GUI may use a column format. For example, the at least one upstream application is displayed in a left-hand side column, the subject application is displayed in a middle column, and the at least one downstream application is displayed in a right-hand side column. In addition, the data flow software tool may repopulate the GUI to display a selected upstream application or a selected downstream application as a new subject application. In addition, the GUI can comprise for the at least one upstream application and/or the at least one downstream application displayed in the GUI, an indication of an agreement status of the incoming or outgoing data flow to the subject application, as the case may be. The indication can comprise, for example, an agreement status identifier selected from group consisting of: discovered by the software tool as an incoming data flow to the subject application; alleged by a user as an incoming data flow to the subject application; pending verification as an incoming data flow to the subject application; and declined as an incoming data flow to the subject application. Also, the GUI may comprises an authority icon that when selected by the user causes a listing of authorized upstream applications for providing incoming data to the subject application having a selected data concept type.

In yet other implementations, the data flow software tool performs a data flow analysis on the distributed computing system to identify and display on the GUI applications, from the plurality of applications, that would be impacted by a data error by the subject application. The data flow analysis identifies applications impacted by a data error by the subject application by identifying downstream applications that receive outgoing data from the subject application.

In yet other implementations, the GUI provides an add-new-data-flow interface for the user to define a new data flow to the subject application for an upstream application. The add-new-data-flow interface can comprise a first field for the user to select a data concept type for the new data flow from a system dictionary of available data concept types. The add-new-data-flow interface can also comprise a second field for the user to specify boundary data for the selected data concept type and/or a third field for the user to specify a contributing data concept type for the selected data concept type and an upstream application for the contributing data concept type.

In another general aspect, the inventive distributed computing environment 10 comprises a plurality of distributed computer systems 52 interconnected by one or more data networks 56, 58 that executes a plurality of applications 2, and the data flow software tool 70 (when executed by at least one of the distributed computer systems executes) identifies potential data flows between the plurality of applications based on data transfer mechanisms the applications write data to and read data from, and generates the GUI that shows at least one upstream application and at least one downstream application for a subject application based on the identified data flows.

In yet another general aspect, the present invention is directed to a method for tracking data flows in a distributed computing environment. The method comprises the steps of (i) identifying, by at least one computer system in the distributed computing environment, potential data flows between a plurality of applications executed by the plurality of computer systems in a distributed computer systems and (ii) generating, by the at least one computer system in the distributed computing environment, a GUI that shows at least one upstream application and at least one downstream application for a subject application. The method further comprises the steps of (iii) receiving, via the GUI, from the user, a first input for the at least one upstream application, wherein the first input comprises verification that the at least one upstream application provides the incoming data flow to the subject application, and (iv) receiving, via the GUI, a second input for the at least one downstream application, wherein the second input comprises verification that the at least one downstream application receives the outgoing data flow from the subject application.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention.

The various components of the environment 10 and the distributed computing system 100 may be and/or are executed by any suitable type of computing device including, for example, servers, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A distributed computing environment, comprising:
a plurality of distributed computer systems interconnected by one or more data networks, wherein the plurality of distributed computer systems execute a plurality of applications, and wherein at least one of the distributed computer systems executes a data flow software tool that causes the at least one of the distributed computer systems to:
track and identify errors in data flows between the plurality of applications by identifying potential data flows between the plurality of applications, wherein each of the identified potential data flows is a data flow between two of the plurality of applications, wherein for each of the identified potential data flows a first application of the two applications writes data to a data storage location of the distributed computing environment and a second application of the two applications reads the data from the data storage location, and the data flow software tool identifies the data flow between the two applications based on received metadata identifying the data storage location to which the first application writes data and from which the second application reads the data;
generate a graphical user interface (GUI) that shows at least one upstream application and at least one downstream application for a subject application, wherein:
the subject application is selected by a user via the GUI;
the at least one upstream application is an application that provides an incoming data flow to the subject application;
the at least one downstream application is an application that receives an outgoing data flow from the subject application; and
the at least one upstream application and at least one downstream application of the subject application are determined based on the identification of the potential data flows between the plurality of applications;
receive, via the GUI, from the user, a first input for the at least one upstream application and a second input for the at least one downstream application, wherein the first input from the user verifies that the at least one upstream application provides the incoming data flow to the subject application and the second input from the user verifies that the at least one downstream application receives the outgoing data flow from the subject application;
assign, by the user, to the incoming data flow both (i) a data concept type from a list of pre-specified data concept types and (ii) data flow boundary data, wherein the assigned data concept type relates to a business function of the incoming data flow, and wherein the assigned data flow boundary data defines a subset of the assigned data concept type and is selected from pre-specified data flow boundaries for the assigned data concept type and wherein the assigning of the data concept type and the data flow boundary data further causes the at least one of the distributed computer systems to:

display the list of the pre-specified data content types wherein at least one of the pre-specified data concept types is a trade contract, a financial position, a market valuation, a profit and loss (P&L) or a general ledger concept type; and receive a selection by a user of one of the pre-specified data concept types from the list to be the assigned data concept type;

identify that the subject application is impacted by a data error of the at least one upstream application;

display, on the GUI, an indication that the subject application is impacted by the data error; and identify an alternative application to provide the incoming data flow by identifying the alternative application that has a data flow that comprises a data concept type that is the same as the assigned data concept type and that comprises data flow boundary data that is the same as or encompasses the assigned data flow boundary data.

2. The distributed computing environment of claim 1, wherein the GUI displays the at least one upstream application, the subject application, and the at least one downstream application in a plurality of columns, wherein the at least one upstream application is displayed in a left-hand side column, the subject application is displayed in a middle column, and the at least one downstream application is displayed in a right-hand side column.

3. The distributed computing environment of claim 1, wherein the data flow software tool repopulates the GUI to display a selected upstream application or a selected downstream application as a new subject application.

4. The distributed computing environment of claim 1, wherein the data flow software tool identifies that the at least one downstream application is impacted by the data error based on the at least one downstream application receiving the outgoing data flow from the subject application.

5. The distributed computing environment of claim 1, wherein the user is a first user and the GUI displays an indication of a first status of agreement of the incoming data flow to the subject application based on a second user providing a third input to confirm that the at least one upstream application provides the incoming data flow to the subject application.

6. The distributed computing environment of claim 5, wherein the GUI displays an indication of a second status of agreement of the outgoing data flow from the subject application based on the second user providing a fourth input to confirm that the at least one downstream application receives the outgoing data flow from the subject application.

7. The distributed computing environment of claim 5, wherein the GUI displays an agreement status identifier for the incoming data flow for the subject application, wherein the agreement status identifier is selected from the group consisting of:

a first status identifier that indicates that a data flow was discovered by the software tool as the incoming data flow to the subject application;

a second status identifier that indicates that a data flow was alleged by a user as the incoming data flow to the subject application;

a third status identifier that indicates that a data flow is pending verification as the incoming data flow to the subject application; and a fourth status identifier that indicates that a data flow was declined as the incoming data flow to the subject application.

8. The distributed computing environment of claim 1, wherein the software tool further assigns attribute data to the identified potential data flows, wherein the attribute data for an identified potential data flow comprises parameters associated with the assigned data concept type.

9. The distributed computing environment of claim 8, wherein:

a data concept type and data flow boundary data are assigned to each of the identified potential data flows;

the data concept type assigned to each of the potential data flows comprises at least one of a trade contract, a financial position, a market valuation, a profit and loss (P&L), and a general ledger data concept type; and the data flow boundary data assigned to each of the potential data flows comprises at least one of a type of security, a geographic location, and a legal jurisdiction data flow boundary data.

10. The distributed computing environment of claim 8, wherein the attribute data comprises a price relevant to the assigned data concept type.

11. The distributed computing environment of claim 8, wherein a data concept type assigned to a first potential data flow of the identified potential data flows comprises a market valuation data concept type and the attribute data comprises at least one of market value amount and market value currency attribute data.

12. The distributed computing environment of claim 1, wherein the GUI provides an add-new-data-flow interface for the user to define a new data flow to the subject application for a new upstream application.

13. The distributed computing environment of claim 12, wherein the add-new-data-flow interface comprises a first field for the user to choose a data concept type for the new data flow from a system dictionary of available data concept types.

14. The distributed computing environment of claim 13, wherein the add-new-data-flow interface comprises a second field for the user to specify boundary data for the chosen data concept type.

15. The distributed computing environment of claim 13, wherein the add-new-data-flow interface comprises a third field for the user to specify a contributing data concept type for the chosen data concept type and an upstream application for the contributing data concept type.

16. The distributed computing environment of claim 1, wherein the GUI comprises an authority icon that when selected by the user causes a listing of authorized upstream applications for providing incoming data to the subject application.

17. The distributed computing environment of claim 1, wherein the data storage location comprises a data storage location selected from the group consisting of data queues, data stacks, databases, pub/sub data services, data directories, and mainframe adaptable database systems.

18. A method for tracking data flows in a distributed computing environment, wherein the distributed computing environment comprises a plurality of computer systems, the method comprising:

identifying, by at least one computer system in the distributed computing environment, potential data flows between a plurality of applications executed by the plurality of computer systems, wherein each of the identified potential data flows is a data flow between two of the plurality of applications, wherein for each of the identified potential data flows a first application of the two applications writes data to a data storage location of the distributed computing environment and a second application of the two applications reads the data from the data storage location, and a potential data flow between the two applications is identified based on received metadata identifying the data storage location to which the first application writes data and from which the second application reads the data;

generating, by the at least one computer system in the distributed computing environment, a graphical user interface (GUI) that shows at least one upstream application and at least one downstream application for a subject application, wherein:
- the subject application is selected by a user via the GUI;
- the at least one upstream application is an application that provides an incoming data flow to the subject application;
- the at least one downstream application is an application that receives an outgoing data flow from the subject application; and
- the at least one upstream application and the at least one downstream application of the subject application are determined based on the identification of the potential data flows between the plurality of applications;

receiving, via the GUI, from the user, a first input for the at least one upstream application, wherein the user uses the first input to verify that the at least one upstream application provides the incoming data flow to the subject application;

receiving, via the GUI, a second input for the at least one downstream application, wherein the user uses the second input to verify that the at least one downstream application receives the outgoing data flow from the subject application;

receiving, via the GUI, an assignment from the user wherein the assignment assigns to the incoming data flow both (i) a data concept type from a list of pre-specified data concept types and (ii) data flow boundary data, wherein the assigned data concept type relates to a business function of the incoming data flow, and wherein the assigned data flow boundary data defines a subset of the assigned data concept type and is selected from pre-specified data flow boundaries for the assigned data concept type and wherein receiving the assignment of the data concept type and the data flow boundary data further comprises:
- displaying on the GUI the list of the pre-specified data content types wherein at least one of the pre-specified data concept types is a trade contract, a financial position, a market valuation, a profit and loss (P&L) or a general ledger concept type; and
- receiving a selection by a user of one or the pre-specified data concept types from the list to be the assigned data concept type;

identifying that the subject application is impacted by a data error of the at least one upstream application;

displaying, on the GUI, an indication that the subject application is impacted by the data error; and identifying an alternative application to provide the incoming data flow by identifying the alternative application that has a data flow that comprises a data concept type that is the same as the assigned data concept type and that comprises data flow boundary data that is the same as or encompasses the assigned data flow boundary data.

19. The method of claim 18, wherein the GUI displays the at least one upstream application, the subject application, and the at least one downstream application in a plurality of columns, wherein the at least one upstream application is displayed in a left-hand side column, the subject application is displayed in a middle column, and the at least one downstream application is displayed in a right-hand side column.

20. The method of claim 19, further comprising repopulating the GUI to display a selected upstream application or a selected downstream application as a new subject application.

* * * * *